US012449745B2

(12) United States Patent
Sato

(10) Patent No.: US 12,449,745 B2
(45) Date of Patent: Oct. 21, 2025

(54) IMAGE FORMING APPARATUS INCLUDING MAIN HOUSING, FIRST DRUM CARTRIDGE HAVING FIRST PHOTOSENSITIVE DRUM, AND SECOND DRUM CARTRIDGE HAVING SECOND PHOTOSENSITIVE DRUM

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/767,041

(22) Filed: Jul. 9, 2024

(65) Prior Publication Data

US 2025/0068097 A1 Feb. 27, 2025

(30) Foreign Application Priority Data

Aug. 22, 2023 (JP) ................................ 2023-135073

(51) Int. Cl.
*G03G 15/08* (2006.01)
*G03G 15/00* (2006.01)

(52) U.S. Cl.
CPC ..... *G03G 15/0867* (2013.01); *G03G 15/0886* (2013.01); *G03G 15/751* (2013.01)

(58) Field of Classification Search
CPC ........... G03G 15/0867; G03G 15/0886; G03G 15/751
USPC ......................... 399/107, 110, 111, 258, 262
See application file for complete search history.

(56) References Cited

U.S. PATENT DOCUMENTS

| | | | | |
|---|---|---|---|---|
| 11,693,354 | B2 * | 7/2023 | Sato | G03G 21/1633 399/114 |
| 2007/0223963 | A1 | 9/2007 | Suzuki et al. | |
| 2007/0223964 | A1 | 9/2007 | Takagi | |
| 2007/0223965 | A1 | 9/2007 | Takagi | |
| 2007/0223971 | A1 | 9/2007 | Takagi | |
| 2021/0063958 | A1 | 3/2021 | Taguchi et al. | |

(Continued)

FOREIGN PATENT DOCUMENTS

| | | |
|---|---|---|
| JP | 2008-176215 A | 7/2008 |
| JP | 2018-025571 A | 2/2018 |
| JP | 2021-039214 A | 3/2021 |

(Continued)

*Primary Examiner* — Hoan H Tran
(74) *Attorney, Agent, or Firm* — Merchant & Gould P.C.

(57) ABSTRACT

An image forming apparatus includes: a main housing; a first drum cartridge including a first photosensitive drum; a second drum cartridge including a second photosensitive drum; a first toner cartridge to be coupled to the first drum cartridge; and a second toner cartridge to be coupled to the second drum cartridge. The first drum cartridge and the second drum cartridge are attachable to and detachable from the main housing. The first drum cartridge further includes: a first frame; a second frame; a third frame immovable relative to the first photosensitive drum; a developing housing movable relative to the first photosensitive drum; and a sealing member sealing a gap between the developing housing and the third frame. The third frame has a first passage opening configured to allow toner from the first toner cartridge to pass therethrough. The sealing member is positioned around and away from the first passage opening.

9 Claims, 18 Drawing Sheets

(56) References Cited

U.S. PATENT DOCUMENTS

| | | | |
|---|---|---|---|
| 2021/0191311 | A1 | 6/2021 | Sato et al. |
| 2022/0011691 | A1 | 1/2022 | Sato |

FOREIGN PATENT DOCUMENTS

| | | |
|---|---|---|
| JP | 2021-101210 A | 7/2021 |
| JP | 2022-015016 A | 1/2022 |

* cited by examiner

IMAGE FORMING APPARATUS INCLUDING MAIN HOUSING, FIRST DRUM CARTRIDGE HAVING FIRST PHOTOSENSITIVE DRUM, AND SECOND DRUM CARTRIDGE HAVING SECOND PHOTOSENSITIVE DRUM

REFERENCE TO RELATED APPLICATIONS

This application claims priority from Japanese Patent Application No. 2023-135073 filed on Aug. 22, 2023. The entire content of the priority application is incorporated herein by reference.

BACKGROUND ART

There has been conventionally known an image forming apparatus including a main housing, a drum cartridge, and a toner cartridge.

In such a conventional image forming apparatus, the drum cartridge includes a photosensitive drum, a drum frame, a developing housing, and a developing roller. The toner cartridge is configured to accommodate toner therein. The photosensitive drum is rotatably supported by the drum frame. The developing housing is supported by the drum frame. The developing roller is supported by the developing housing, and is configured to supply toner in the developing housing to the photosensitive drum. The developing housing includes a support part configured to support the toner cartridge. The developing housing has an inlet opening. In a state where the toner cartridge is supported by the support part, toner in the toner cartridge can pass through the inlet opening of the developing housing.

SUMMARY

In such a conventional image forming apparatus, there may be a demand for configuring the developing housing that supports the developing roller to be movable relative to the photosensitive drum in order to maintain a pressing force of the developing roller against the photosensitive drum to be constant.

However, since the developing housing supports the toner cartridge in the conventional image forming apparatus, the weight of the toner cartridge may make it difficult to move the developing housing relative to the photosensitive drum.

Thus, it is conceivable to configure only the developing housing to be movable relative to the photosensitive drum while maintaining the toner cartridge to be immovable relative to the photosensitive drum.

In such a structure, toner needs to be stably supplied from the toner cartridge that is immovable relative to the photosensitive drum to the developing housing that is movable relative to the photosensitive drum while restraining leakage of the toner.

In view of the foregoing, it is an object of the present disclosure to provide an image forming apparatus capable of stably supplying toner from a toner cartridge that is immovable relative to a photosensitive drum to a developing housing that is movable relative to the photosensitive drum while restraining the toner from leaking.

In order to attain the above and other objects, the present disclosure provides an image forming apparatus including: a main housing; a first drum cartridge; a second drum cartridge; a first toner cartridge; and a second toner cartridge. The first drum cartridge includes a first photosensitive drum rotatable about a first axis extending in a first direction. The first drum cartridge is attachable to and detachable from the main housing. The second drum cartridge includes a second photosensitive drum rotatable about a second axis extending in the first direction. The second drum cartridge is attachable to and detachable from the main housing. The first drum cartridge and the second drum cartridge are arranged in a second direction crossing the first direction in a state where both the first drum cartridge and the second drum cartridge are attached to the main housing. The first toner cartridge is configured to accommodate toner therein. The first toner cartridge is configured to be coupled to the first drum cartridge in a third direction crossing both the first direction and the second direction. The second toner cartridge is configured to accommodate toner therein. The second toner cartridge is configured to be coupled to the second drum cartridge in the third direction. The first drum cartridge further includes: a first frame; a second frame; a third frame; a developing housing; and a sealing member. The first frame supports one end portion in the first direction of the first photosensitive drum. The second frame supports another end portion in the first direction of the first photosensitive drum. The third frame has a first passage opening configured to allow toner from the first toner cartridge to pass therethrough. The third frame being immovable relative to the first photosensitive drum. The developing housing is configured to accommodate therein toner that has passed through the first passage opening. The developing housing is movable relative to the first photosensitive drum. The sealing member is positioned around and away from the first passage opening. The sealing member seals a gap between the developing housing and the third frame.

In the above structure, the sealing member is positioned around and away from the first passage opening. This structure can restrain toner from contacting the sealing member when the toner is supplied from the first toner cartridge to the first developing housing through the first passage opening, thereby restraining flow of toner from the first toner cartridge toward the first developing housing from being interrupted by the sealing member. As a result, toner can be stably supplied from the first toner cartridge that is immovable relative to the first photosensitive drum to the first developing housing that is movable relative to the first photosensitive drum while restraining toner from leaking from a gap between the developing housing and the third frame.

DESCRIPTION

Hereinafter, one embodiment the present disclosure will be described while referring to the accompanying drawings.

1. Outline of Image Forming Apparatus 1

Figure 1:
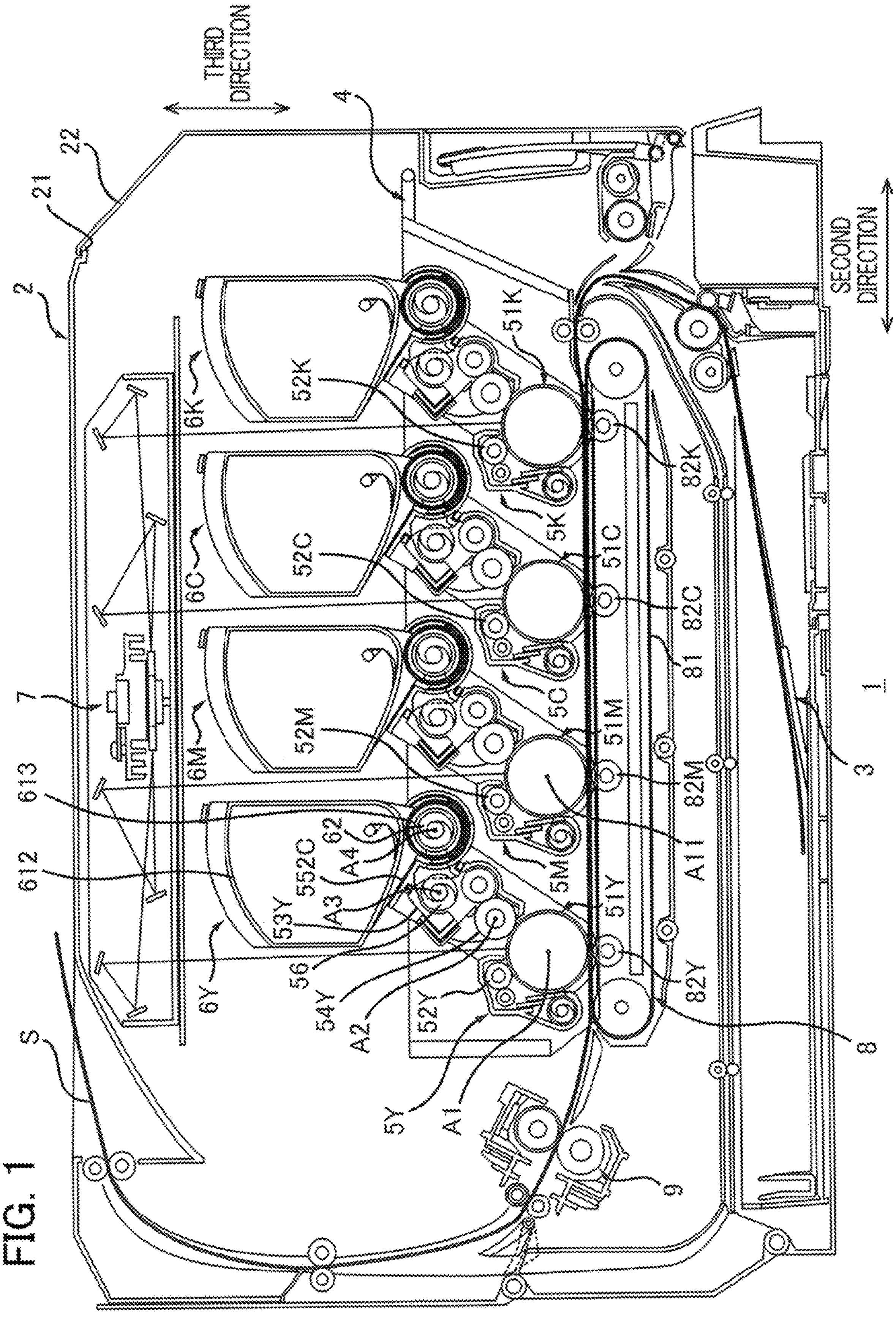
FIG. 1 is a cross-sectional view illustrating the overall structure of an image forming apparatus.

An outline of an image forming apparatus 1 according to the embodiment will be described with reference to FIGS. 1 through 3. As illustrated in FIG. 1, the image forming apparatus 1 includes a main housing 2, a sheet accommodating unit 3, a drawer 4, a plurality of drum cartridges 5Y, 5M, 5C, and 5K, a plurality of toner cartridges 6Y, 6M, 6C, and 6K, an exposure unit 7, a transfer unit 8, and a fixing unit 9.

<1.1 Main Housing 2>

The main housing 2 accommodates therein the sheet accommodating unit 3, the drawer 4, the plurality of drum cartridges 5Y, 5M, 5C, and 5K, the plurality of toner cartridges 6Y, 6M, 6C, and 6K, the exposure unit 7, the transfer unit 8, and the fixing unit 9. The main housing 2 has an opening 21, and includes a cover 22. The opening 21 is formed at one end portion in a second direction of the main housing 2. The second direction will be described later. The cover 22 is movable between a closed position (see FIG. 1) and an open position (see FIG. 2). As illustrated in FIG. 1, in a state where the cover 22 is at the closed position, the cover 22 closes the opening 21. As illustrated in FIG. 2, in a state where the cover 22 is at the open position, the opening 21 is open.

<1.2 Sheet Accommodating Unit 3>

As illustrated in FIG. 1, the sheet accommodating unit 3 is configured to accommodate therein a sheet S. The sheet S in the sheet accommodating unit 3 is configured to be conveyed toward the transfer unit 8.

<1.3 Drawer 4>

Figure 2:
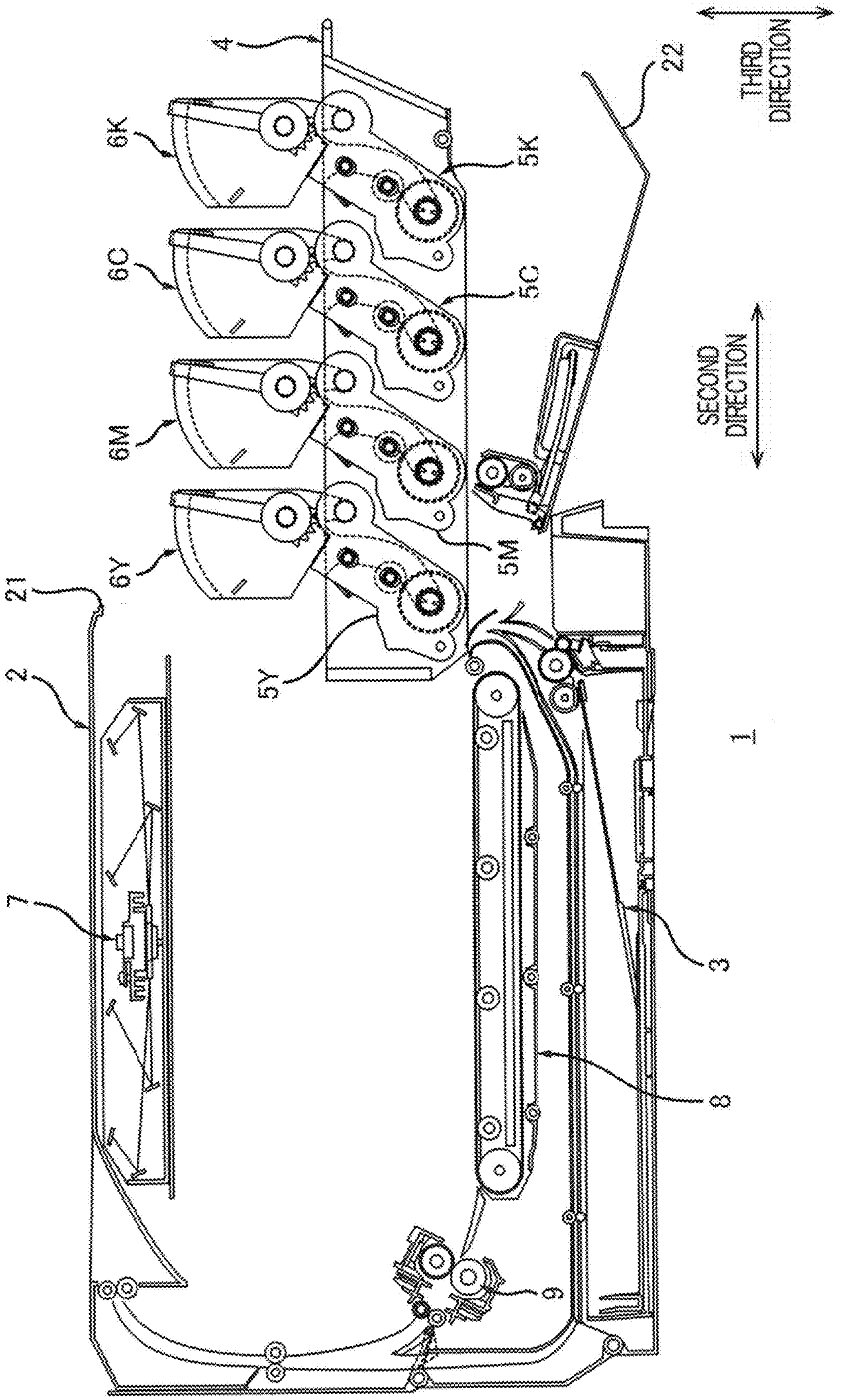
FIG. 2 is a view of the image forming apparatus illustrating a state where a drawer is at its external position.
Figure 3:
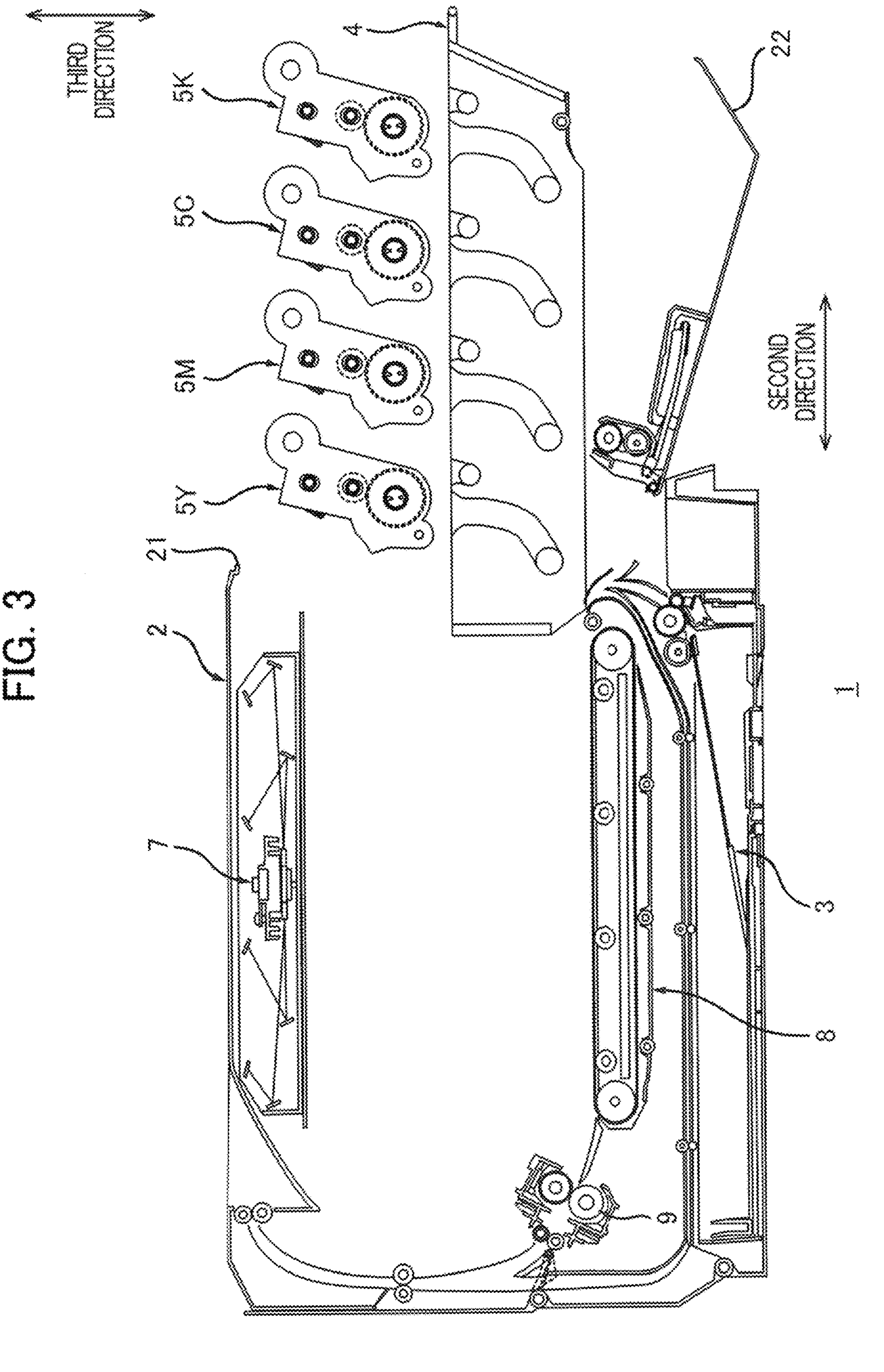
FIG. 3 is a view of the image forming apparatus illustrating a state where the drawer is at the external position and drum cartridges are detached from the drawer.

As illustrated in FIGS. 1 and 2, the drawer 4 is movable in the second direction through the opening 21 between an internal position (see FIG. 1) and an external position (see FIG. 2). The second direction is parallel to a horizontal direction. As illustrated in FIG. 1, in a state where the drawer 4 is at the internal position, the drawer 4 is positioned inside the main housing 2. As illustrated in FIG. 2, in a state where the drawer 4 is at the external position, at least a portion of the drawer 4 is positioned outside the main housing 2.

<1.4 Drum Cartridge 5Y>

The drum cartridge 5Y is attachable to and detachable from the main housing 2. Specifically, in a state where the drawer 4 is at the external position as illustrated in FIG. 3, each of the drum cartridges 5Y, 5M, 5C, and 5K is attachable to the drawer 4. As illustrated in FIG. 1, in a state where the drum cartridges 5Y, 5M, 5C, and 5K are attached to the drawer 4 and the drawer 4 is at the internal position, the drum cartridges 5Y, 5M, 5C, and 5K are attached to the main housing 2. That is, the drum cartridges 5Y, 5M, 5C, and 5K are configured to be supported by the drawer 4. As illustrated in FIG. 3, in a state where the drawer 4 is at the external position, each of the drum cartridges 5Y, 5M, 5C, and 5K is detachable from the drawer 4.

As illustrated in FIG. 1, the drum cartridge 5Y includes a photosensitive drum 51Y, a charge roller 52Y, a developing housing 53Y, and a developing roller 54Y.

<1.4.1 Photosensitive Drum 51Y>

The photosensitive drum 51Y is rotatable about a first axis A1 extending in a first direction. The first direction crosses the second direction. In the present embodiment, the first direction is orthogonal to the second direction.

<1.4.2 Charge Roller 52Y>

The charge roller 52Y is configured to charge an outer circumferential surface of the photosensitive drum 51Y. Note that the image forming apparatus 1 may employ a scorotron charger instead of the charge roller 52Y.

<1.4.3 Developing Housing 53Y>

The developing housing 53Y is configured to accommodate toner therein. The developing housing 53Y supports the developing roller 54Y.

<1.4.4 Developing Roller 54Y>

The developing roller 54Y is configured to supply toner in the developing housing 53Y to the photosensitive drum 51Y. The developing roller 54Y contacts the photosensitive drum 51Y. The developing roller 54Y may be configured to separate from the photosensitive drum 51Y. The developing roller 54Y is rotatable about a developing axis A2 extending in the first direction. The developing roller 54Y has a solid cylindrical shape.

<1.5 Drum Cartridges 5M, 5C, and 5K>

Each of the drum cartridges 5M, 5C, and 5K has a structure the same as that of the drum cartridge 5Y. Hence, a detailed description as to the drum cartridges 5M, 5C, and 5K will be omitted. The drum cartridge 5M includes a photosensitive drum 51M, and a charge roller 52M. The photosensitive drum 51M is rotatable about a second axis A11 extending in the first direction. The drum cartridge 5M is attachable to and detachable from the main housing 2. In a state where both the drum cartridge 5Y and the drum cartridge 5M are attached to the main housing 2, the drum cartridge 5M and the drum cartridge 5Y are arranged in the second direction.

The drum cartridge 5C includes a photosensitive drum 51C, and a charge roller 52C. The drum cartridge 5K includes a photosensitive drum 51K, and a charge roller 52K. The drum cartridge 5C and the drum cartridge 5K are attachable to and detachable from the main housing 2.

<1.6 Toner Cartridges 6Y, 6M, 6C, and 6K>

The toner cartridge 6Y is configured to accommodate toner therein. The toner cartridge 6Y is configured to be coupled to the drum cartridge 5Y in a third direction. The third direction will be described later.

The toner cartridge 6M is configured to accommodate toner therein. The toner cartridge 6M is configured to be coupled to the drum cartridge 5M in the third direction.

The toner cartridge 6M is configured to accommodate toner therein. The toner cartridge 6C is configured to be coupled to the drum cartridge 5C in the third direction.

The toner cartridge 6K is configured to accommodate toner therein. The toner cartridge 6K is configured to be coupled to the drum cartridge 5K in the third direction.

<1.7 Exposure Unit 7>

In a state where the drum cartridges 5Y, 5M, 5C, and 5K are attached to the main housing 2, the exposure unit 7 is configured to expose outer circumferential surfaces of the photosensitive drums 51Y, 51M, 51C, and 51K to light.

Specifically, the exposure unit 7 is configured to expose to the outer circumferential surface of the photosensitive drum 51Y to light after the outer circumferential surface of the photosensitive drum 51Y has been charged by the charge roller 52Y. The exposure unit 7 is configured to expose the outer circumferential surface of the photosensitive drum 51M to light after the outer circumferential surface of the photosensitive drum 51M has been charged by the charge roller 52M. The exposure unit 7 is configured to expose the outer circumferential surface of the photosensitive drum 51C to light after the outer circumferential surface of the photosensitive drum 51C has been charged by the charge roller 52C. The exposure unit 7 is configured to expose the outer circumferential surface of the photosensitive drum 51K to light after the outer circumferential surface of the photosensitive drum 51K has been charged by the charge roller 52K.

<1.8 Transfer Unit 8>

In a state where the drum cartridges 5Y, 5M, 5C, and 5K are attached to the main housing 2, the transfer unit 8 is positioned downward of the photosensitive drums 51Y, 51M, 51C, and 51K. The transfer unit 8 includes a belt 81, and a plurality of transfer rollers 82Y, 82M, 82C, and 82K.

In a state where the drum cartridges 5Y, 5M, 5C, and 5K are attached to the main housing 2, the belt 81 contacts the photosensitive drums 51Y, 51M, 51C, 51K. The belt 81 is configured to convey the sheet S from the sheet accommodating unit 3 toward the fixing unit 9. The sheet S from the sheet accommodating unit 3 passes through a portion between the belt 81 and the photosensitive drums 51Y, 51M, 51C, and 51K.

The transfer roller 82Y is configured to transfer toner on the photosensitive drum 51Y to the sheet S while the sheet S is being conveyed by the belt 81. The transfer roller 82M is configured to transfer toner on the photosensitive drum 51M to the sheet S while the sheet S is being conveyed by the belt 81. The transfer roller 82C is configured to transfer toner on the photosensitive drum 51C to the sheet S while the sheet S is being conveyed by the belt 81. The transfer roller 82K is configured to transfer toner on the photosensitive drum 51K to the sheet S while the sheet S is being conveyed by the belt 81.

<1.9 Fixing Unit 9>

The fixing unit 9 is configured to fix toner to the sheet S. In the present embodiment, the fixing unit 9 is configured to apply heat and pressure to the sheet S having toner transferred thereon, thereby fixing the toner to the sheet S. The sheet S that has passed through the fixing unit 9 is configured to be discharged onto an upper surface of the main housing 2.

2. Details of Drum Cartridge 5Y

Next, the drum cartridge 5Y will be described in detail with reference to FIGS. 4 through 9.

In the following description as to the drum cartridge 5Y, "the first direction", "the second direction", and "the third direction" are on a basis of a state where the drum cartridge 5Y is attached to the main housing 2.

In the present embodiment, in a state where the toner cartridge 6Y is coupled to the drum cartridge 5Y and the drum cartridge 5Y is attached to the main housing 2, the drum cartridge 5Y is configured to cause toner in the developing housing 53Y to return to the toner cartridge 6Y. In the following description, the toner returned from the developing housing 53Y to the toner cartridge 6Y will be referred to as "returning toner".

As illustrated in FIGS. 4 to 7, the drum cartridge 5Y further includes a first frame 55A, a second frame 55B, a third frame 55C, a developing shutter 57, two engagement members 58A and 58B, a first conveying member 56, two protrusions 537A and 537B, two protrusions 536A and 536B, and a sealing member 59 in addition to the photosensitive drum 51Y, the charge roller 52Y, the developing housing 53Y, and the developing roller 54Y which are described above.

<2.1 First Frame 55A>

Figure 6:
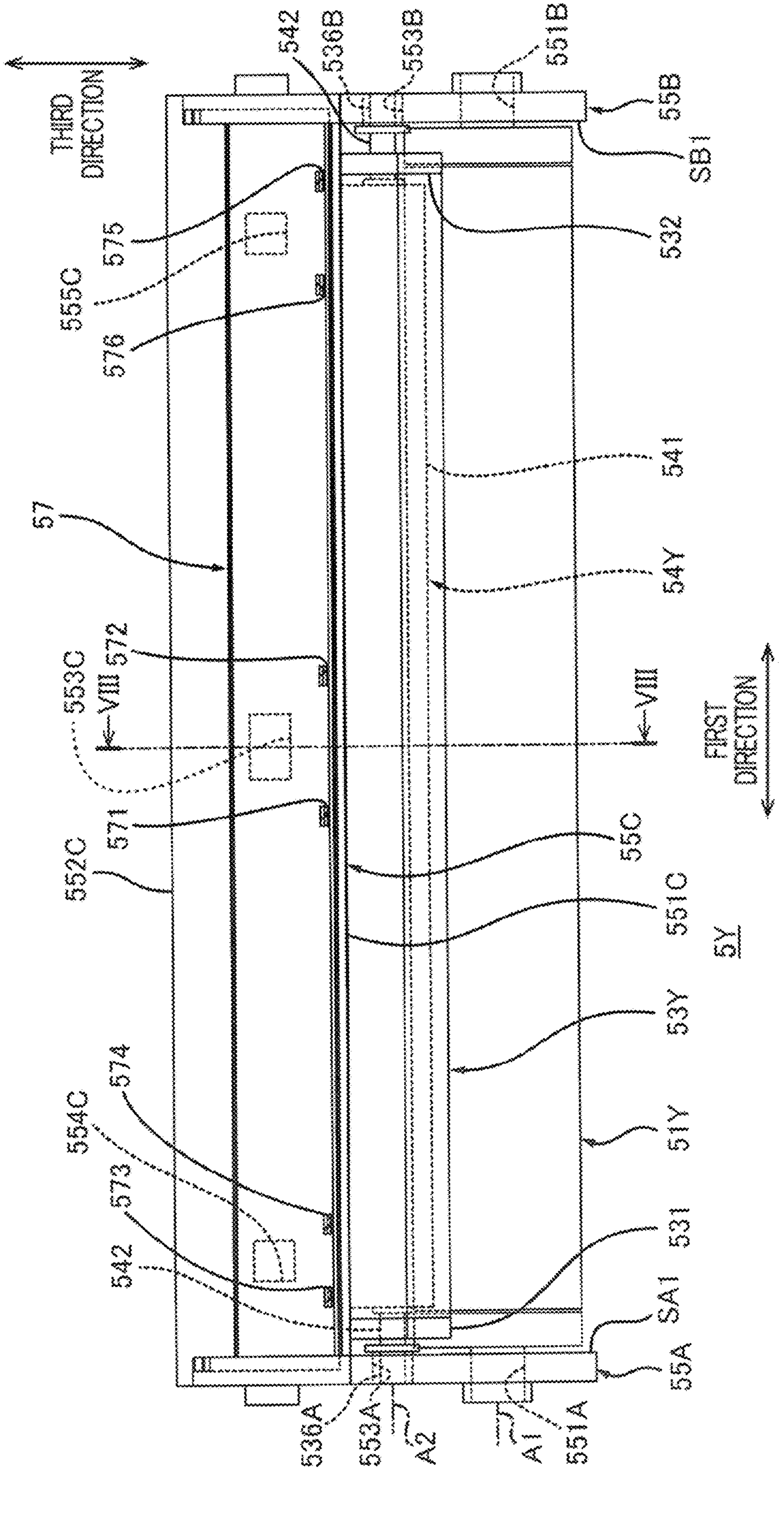
FIG. 6 is a view of the drum cartridge as viewed from one side in a second direction.
Figure 7:
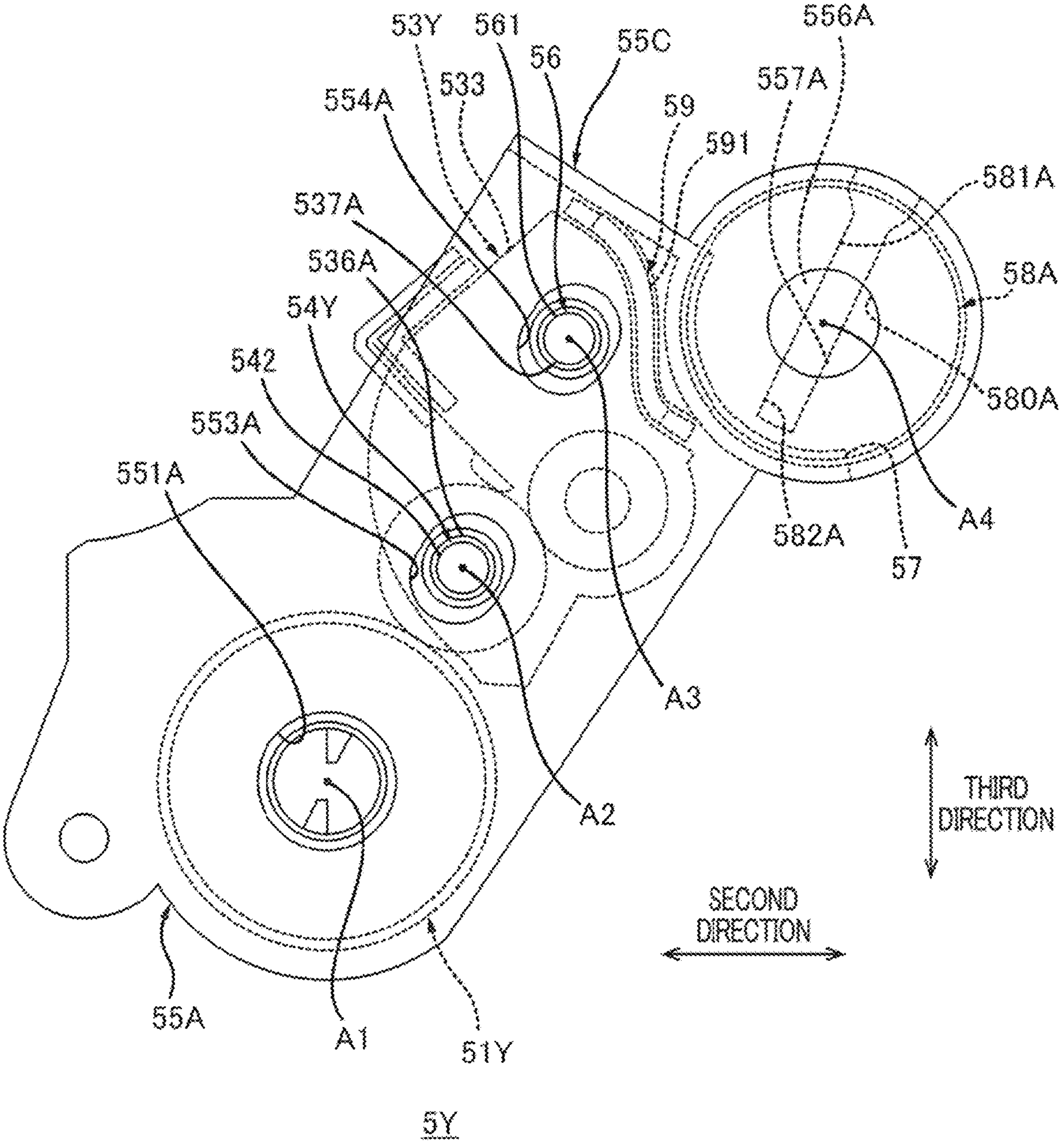
FIG. 7 is a view of the drum cartridge as viewed from one side in a first direction.
Figure 8:
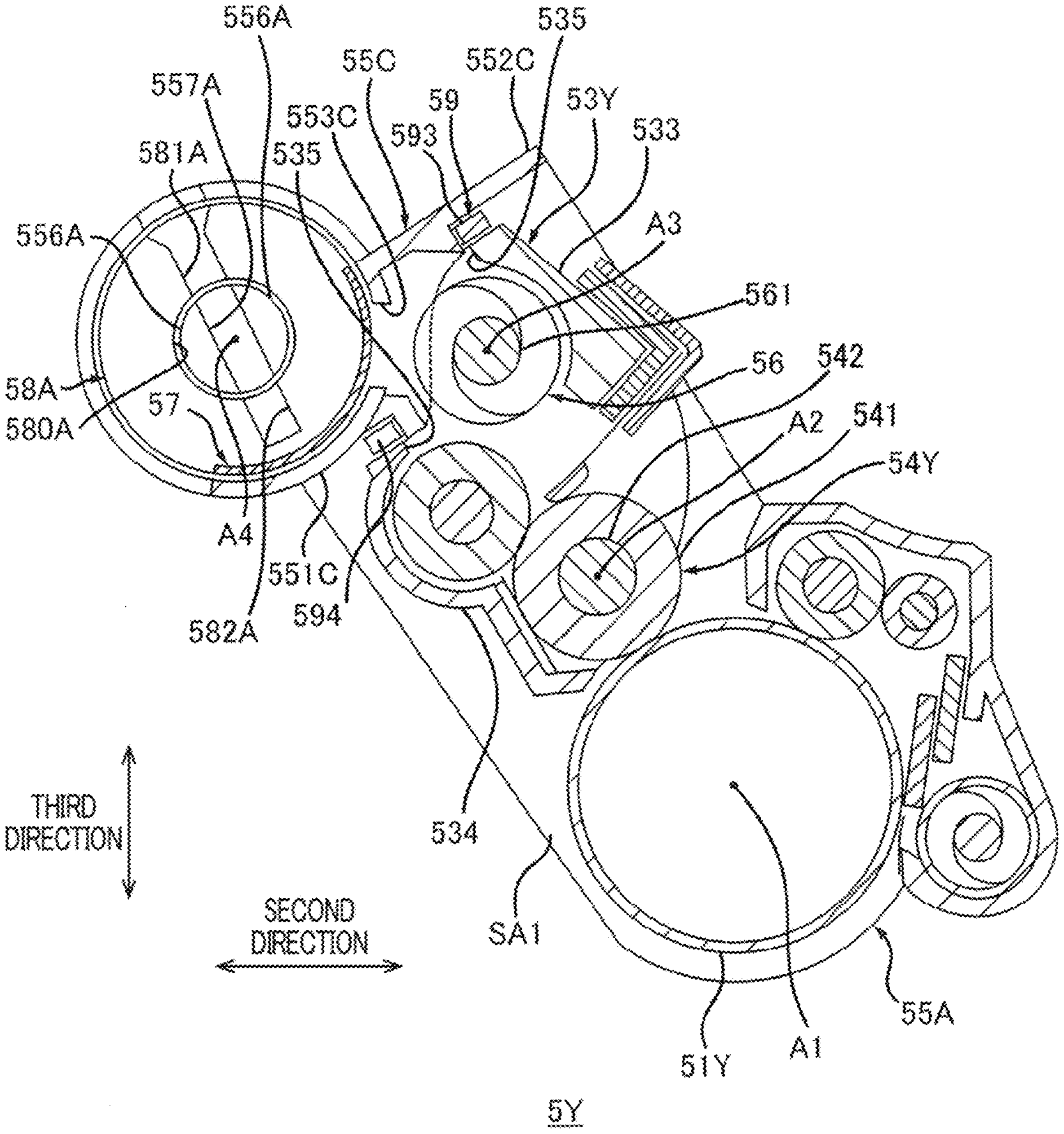
FIG. 8 is a cross-sectional view of the drum cartridge taken along line VIII-VIII in FIG. 6, and illustrating a state where a developing shutter is at its developing closing position.

As illustrated in FIG. 6, the first frame 55A constitutes one end portion in the first direction of the drum cartridge 5Y. The first frame 55A supports one end portion in the first direction of the photosensitive drum 51Y. The first frame 55A extends in a direction crossing the first direction. Preferably, the first frame 55A extends in a direction orthogonal to the first direction. The first frame 55A has an outer surface, and an inner surface SA1. As illustrated in FIG. 7, the first frame 55A has a first through-hole 551A, a second through-hole 554A, and a third through-hole 553A. As illustrated in FIG. 8, the first frame 55A includes a protrusion 556A that supports the engagement member 58A.

<2.1.1 First Through-Hole 551A>

The first frame 55A has one end portion and another end portion in the third direction. The first through-hole 551A is positioned at the other end portion in the third direction of the first frame 55A. The third direction crosses both the first direction and the second direction. The third direction is parallel to an up-down direction. The first through-hole 551A is positioned further downward relative to the developing housing 53Y. The one end portion in the first direction of the photosensitive drum 51Y is fitted in the first through-hole 551A. The first through-hole 551A has a circular shape.

<2.1.2 Second Through-Hole 554A>

The second through-hole 554A is positioned away from the photosensitive drum 51Y in a direction defined by connecting the first axis A1 and the developing axis A2 to each other (hereinafter the direction will be referred to as "connecting direction from the first axis A1 to the developing axis A2"). The second through-hole 554A is a hole elongated in the connecting direction from the first axis A1 to the developing axis A2.

<2.1.3 Third Through-Hole 553A>

The third through-hole 553A is positioned away from the photosensitive drum 51Y in the connecting direction from the first axis A1 to the developing axis A2. The third through-hole 553A is positioned between the photosensitive drum 51Y and the second through-hole 554A in the connecting direction from the first axis A1 to the developing axis A2. The third through-hole 553A is a hole elongated in the connecting direction from the first axis A1 to the developing axis A2.

<2.1.4 Protrusion 556A>

The protrusion 556A is positioned at the inner surface SA1 of the first frame 55A, as illustrated in FIG. 8. The protrusion 556A is positioned at the one end portion in the third direction of the first frame 55A. The protrusion 556A extends in the first direction, and has a solid cylindrical shape. The protrusion 556A has a distal end portion positioned between the inner surface SA1 of the first frame 55A and the second frame 55B in the first direction.

The protrusion 556A has a groove 557A. The groove 557A is formed at the distal end portion of the protrusion 556A. The groove 557A extends in a radial direction of the protrusion 556A. In other words, the groove 557A extends in a direction crossing the first direction, the second direction, and the third direction. Preferably, the groove 557A extends in a direction orthogonal to the first direction and crossing both the second direction and the third direction.

<2.2 Second Frame 55B>

Figure 4:
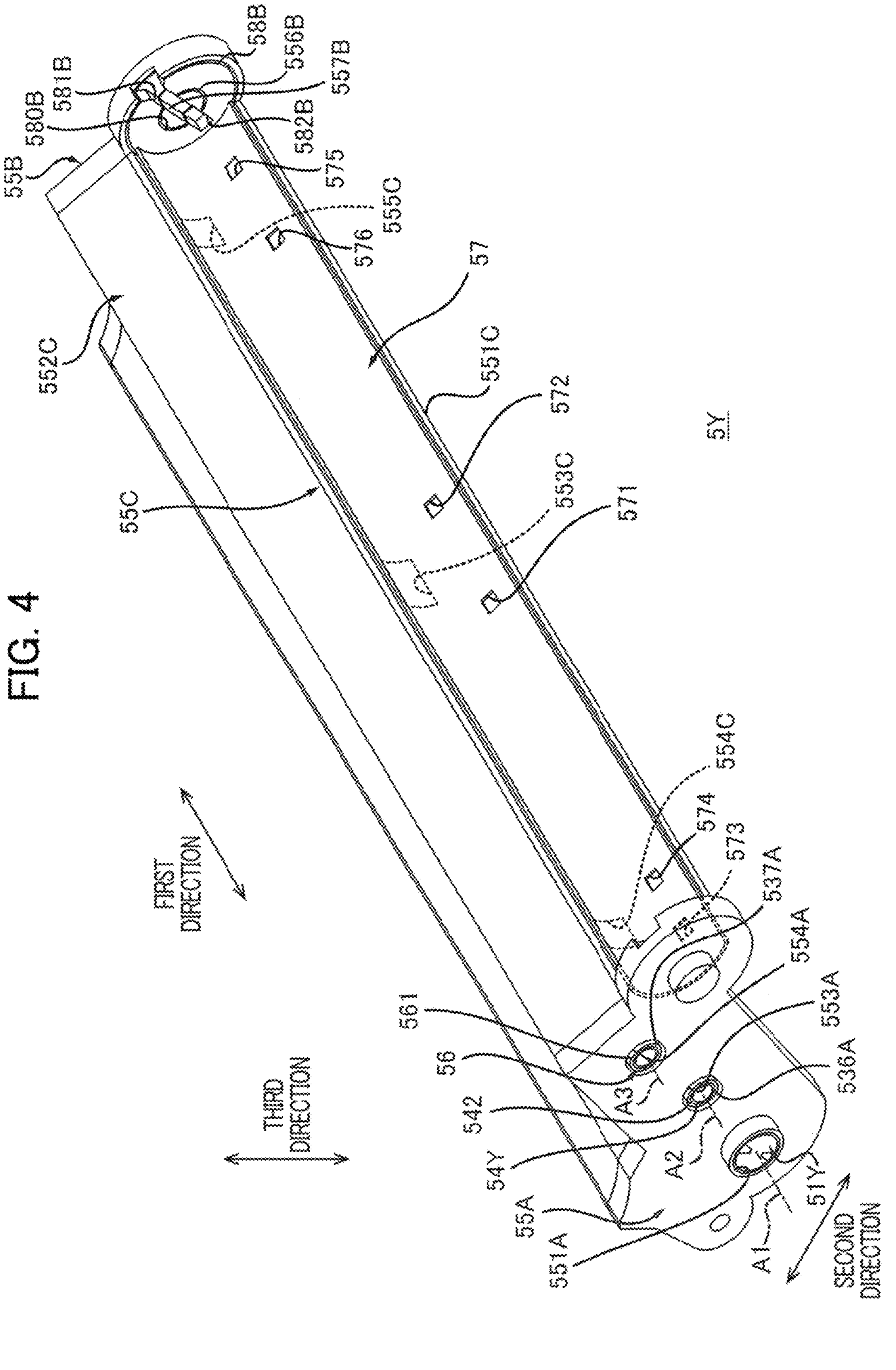
FIG. 4 is a perspective view of the drum cartridge.

As illustrated in FIG. 6, the second frame 55B constitutes another end portion in the first direction of the drum cartridge 5Y. The second frame 55B is positioned away from the first frame 55A in the first direction. The second frame 55B supports another end portion in the first direction of the photosensitive drum 51Y. The second frame 55B extends in a direction crossing the first direction. Preferably, the second frame 55B extends in a direction orthogonal to the first direction. The second frame 55B has an outer surface, and an inner surface SB1. The second frame 55B has a first through-hole 551B, a second through-hole, and a third through-hole 553B. As illustrated in FIG. 4, the second frame 55B includes a protrusion 556B that supports the engagement member 58B. Note that illustration of the second through-hole in the second frame 55B is omitted from the drawings.

<2.2.1 First Through-Hole 551B>

The second frame 55B has one end portion and another end portion in the third direction. The first through-hole 551B is positioned at the other end portion in the third direction of the second frame 55B. The first through-hole 551B is positioned further downward relative to the developing housing 53Y. The other end portion in the first direction of the photosensitive drum 51Y is fitted in the first through-hole 551B. The first through-hole 551B has a circular shape.

<2.2.2 Second Through-Hole>

Although not illustrated in the drawings, the second through-hole in the second frame 55B has a structure similar to the second through-hole 554A of the first frame 55A. Specifically, similar to the second through-hole 554A, the second through-hole in the second frame 55B is positioned away from the photosensitive drum 51Y in the connecting direction from the first axis A1 to the developing axis A2. The second through-hole in the second frame 55B is a hole elongated in the connecting direction from the first axis A1 to the developing axis A2.

<2.2.3 Third Through-Hole 553B>

Similar to the third through-hole 553A of the first frame 55A, the third through-hole 553B is positioned away from the photosensitive drum 51Y in the connecting direction from the first axis A1 to the developing axis A2. The third through-hole 553B is positioned between the photosensitive drum 51Y and the second through-hole of the second frame 55B in the connecting direction from the first axis A1 to the developing axis A2. The third through-hole 553B is a hole elongated in the connecting direction from the first axis A1 to the developing axis A2.

<2.2.4 Protrusion 556B>

The protrusion 556B is positioned at the inner surface SB1 of the second frame 55B as illustrated in FIG. 4. The protrusion 556B is positioned at the one end portion in the third direction of the second frame 55B. The protrusion 556B extends in the first direction, and has a solid cylindrical shape. The protrusion 556B has a distal end portion positioned between the inner surface SB1 of the second frame 55B and the first frame 55A in the first direction.

The protrusion 556B has a groove 557B. The groove 557B is formed at the distal end portion of the protrusion 556B. The groove 557B extends in a radial direction of the protrusion 556B. In other words, the groove 557B extends in a direction crossing the first direction, the second direction, and the third direction. Preferably, the groove 557B extends in a direction orthogonal to the first direction and crossing both the second direction and the third direction.

<2.3 Third Frame 55C>

The third frame 55C constitutes one end portion in the third direction of the drum cartridge 5Y. The third frame 55C is positioned on the opposite side of the developing housing 53Y from the photosensitive drum 51Y in the connecting direction from the first axis A1 to the developing axis A2. As illustrated in FIG. 6, the third frame 55C is positioned between the first frame 55A and the second frame 55B. The third frame 55C extends in the first direction.

One end in the first direction of the third frame 55C is connected to the first frame 55A. Specifically, the one end in the first direction of the third frame 55C is fixed to the first frame 55A.

Another end in the first direction of the third frame 55C is connected to the second frame 55B. Specifically, the other end in the first direction of the third frame 55C is fixed to the second frame 55B. With this configuration, the third frame 55C is immovable relative to the photosensitive drum 51Y.

As illustrated in FIG. 8, the third frame 55C includes a first part 551C, and a second part 552C. As illustrated in FIG. 4, the third frame 55C has a first passage opening 553C, and two second passage openings 554C and 555C.

<2.3.1 First Part 551C>

The first part 551C and the developing housing 53Y are arranged in the second direction. The first part 551C has a portion positioned between the developing shutter 57 and the developing housing 53Y. The first part 551C has a portion positioned between the protrusion 556B and the developing housing 53Y. The first part 551C is positioned away from the protrusion 556B in a radial direction of the protrusion 556B. The first part 551C extends in a circumferential direction of the protrusion 556B. The first part 551C has an arc shape.

<2.3.2 Second Part 552C>

As illustrated in FIG. 1, in a state where the toner cartridge 6Y is coupled to the drum cartridge 5Y, the second part 552C is positioned between the toner cartridge 6Y and the developing housing 53Y in the third direction. As illustrated in FIG. 8, the second part 552C is positioned at one side in the second direction of the first part 551C. The second part 552C extends in the second direction from the first part 551C.

<2.3.3 First Passage Opening 553C>

As illustrated in FIG. 6, the first passage opening 553C is positioned at a center portion in the first direction of the first part 551C. The first passage opening 553C has a rectangular shape and extends in both the first direction and the third direction. As illustrated in FIG. 8, the first passage opening 553C communicates with an internal space of the developing housing 53Y. In a state where the toner cartridge 6Y is coupled to the drum cartridge 5Y, toner supplied from the toner cartridge 6Y can pass through the first passage opening 553C. Specifically, in a state where the toner cartridge 6Y is coupled to the drum cartridge 5Y, toner from the toner cartridge 6Y can pass through the first passage opening 553C in the second direction to enter the developing housing 53Y.

<2.3.4 Second Passage Opening 554C>

As illustrated in FIG. 6, the second passage opening 554C is positioned between the first passage opening 553C and the first frame 55A in the first direction. The second passage opening 554C is positioned away from the first passage opening 553C in the first direction. The second passage opening 554C has a rectangular shape and extends in both the first direction and the third direction. The second passage opening 554C communicates with the internal space of the developing housing 53Y. In a state where the toner cartridge 6Y is coupled to the drum cartridge 5Y, returning toner returning from one end portion in the first direction of the developing housing 53Y to the toner cartridge 6Y can pass through the second passage opening 554C. Specifically, in a state where the toner cartridge 6Y is coupled to the drum cartridge 5Y, the returning toner from the toner cartridge 6Y can pass through the second passage opening 554C in the second direction.

<2.3.5 Second Passage Opening 555C>

The second passage opening 555C is positioned between the first passage opening 553C and the second frame 55B in the first direction. The second passage opening 555C is positioned away from the first passage opening 553C in the first direction. The second passage opening 555C has a rectangular shape and extends in both the first direction and the third direction. The second passage opening 555C communicates with the internal space of the developing housing 53Y. In a state where the toner cartridge 6Y is coupled to the drum cartridge 5Y, returning toner returning from another end portion in the first direction of the developing housing 53Y to the toner cartridge 6Y can pass through the second passage opening 555C. Specifically, in a state where the toner cartridge 6Y is coupled to the drum cartridge 5Y, the returning toner can pass through the second passage opening 555C in the second direction.

<2.4 Developing Shutter 57>

The developing shutter 57 is positioned between the first frame 55A and the second frame 55B. As illustrated in FIG. 8, the developing shutter 57 is positioned on the opposite side of the first passage opening 553C in the first part 551C of the third frame 55C from the developing housing 53Y in the second direction. The developing shutter 57 and the first passage opening 553C are arranged in the second direction. Also, the developing shutter 57 and the two second passage openings 554C and 555C (see FIG. 4) are arranged in the second direction. The developing shutter 57 is supported by the third frame 55C. Specifically, the developing shutter 57 is supported by the first part 551C of the third frame 55C.

Figure 9:
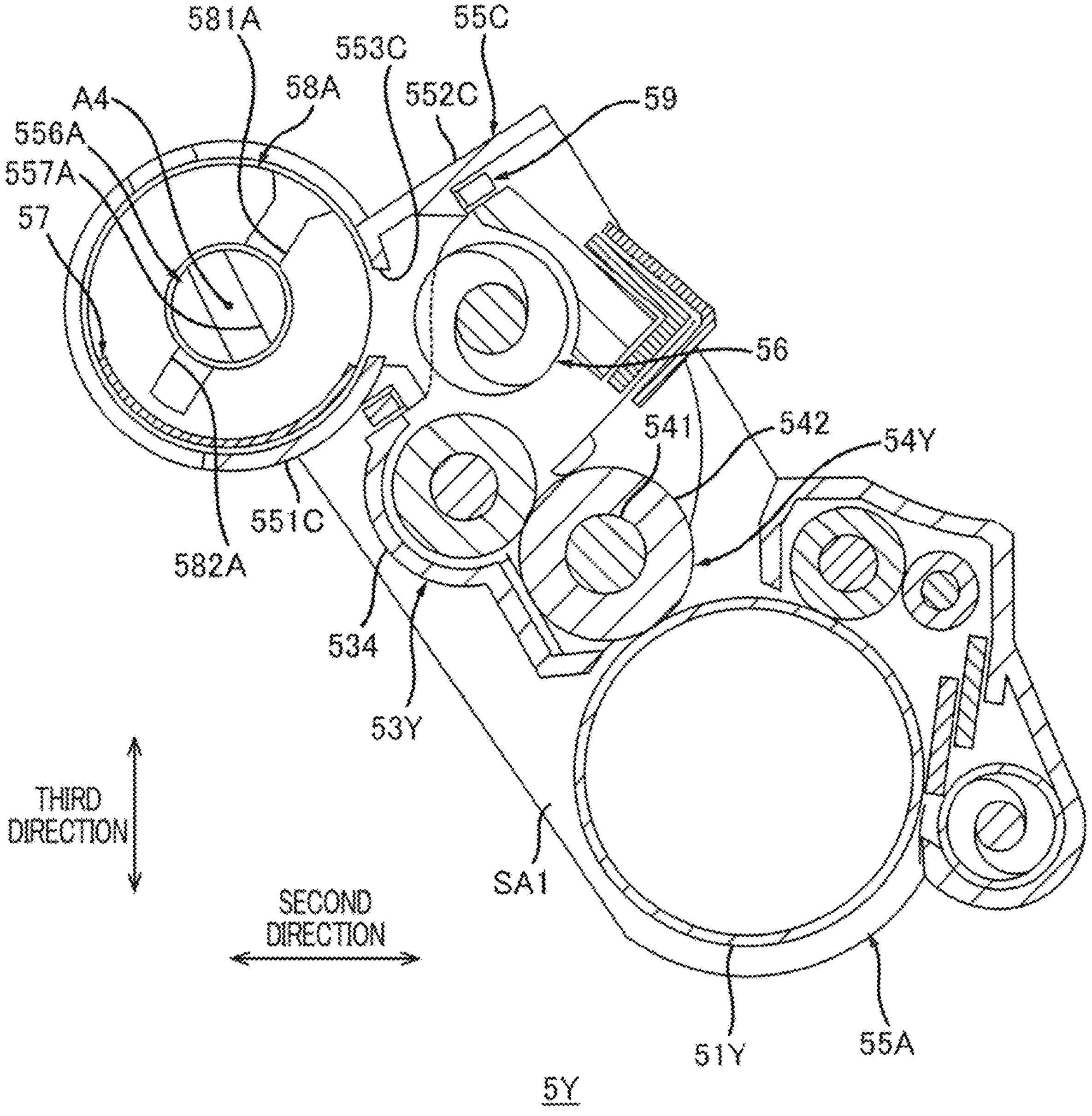
FIG. 9 is a cross-sectional view of the drum cartridge taken along line VIII-VIII in FIG. 6, and illustrating a state where the developing shutter is at its developing opening position.

The developing shutter 57 is movable between a developing closing position (a position illustrated in FIG. 8) and a developing opening position (a position illustrated in FIG. 9). In a state where the developing shutter 57 is at the developing closing position illustrated in FIG. 8, the developing shutter 57 closes the first passage opening 553C and the second passage openings 554C and 555C. In a state where the developing shutter 57 is at the developing opening position illustrated in FIG. 9, the first passage opening 553C and the second passage openings 554C and 555C are open.

As illustrated in FIG. 4, the developing shutter 57 extends in the first direction. The developing shutter 57 is curved so as to be in conformity with the curvature of the first part 551C of the third frame 55C. As illustrated in FIG. 6, the developing shutter 57 has a plurality of holes 571, 572, 573, 574, 575, and 576.

<2.4.1 Holes 571, 572, 573, 574, 575, and 576>

The hole 571 is positioned at a center portion in the first direction of the developing shutter 57. The hole 571 is positioned between the first passage opening 553C and the first frame 55A in the first direction. The hole 571 is positioned away from the first passage opening 553C in the first direction.

The hole 572 is positioned at the center portion in the first direction of the developing shutter 57. The hole 572 is positioned on the opposite side of the first passage opening 553C from the hole 571 in the first direction. The hole 572 is positioned between the first passage opening 553C and the second frame 55B. The hole 572 is positioned away from the first passage opening 553C in the first direction.

The hole 573 is positioned at one end portion in the first direction of the developing shutter 57. The hole 573 is positioned between the second passage opening 554C and the first frame 55A in the first direction. The hole 573 is positioned away from the second passage opening 554C in the first direction, and is also positioned away from the hole 571 in the first direction. The hole 573 is positioned between the first frame 55A and the hole 571 in the first direction.

The hole 574 is positioned at the one end portion in the first direction of the developing shutter 57. The hole 574 is positioned on the opposite side of the second passage opening 554C from the hole 573 in the first direction. The hole 574 is positioned away from the second passage opening 554C in the first direction, and is positioned away from the hole 573 in the first direction. The hole 574 is positioned between the hole 573 and the hole 571 in the first direction.

The hole 575 is positioned at another end portion in the first direction of the developing shutter 57. The hole 575 is positioned between the second passage opening 555C and the second frame 55B in the first direction. The hole 575 is positioned away from the second passage opening 555C in the first direction, and is positioned away from the hole 572 in the first direction. The hole 575 is positioned between the second frame 55B and the hole 572 in the first direction.

The hole 576 is positioned at the other end portion in the first direction of the developing shutter 57. The hole 576 is positioned on the opposite side of the second passage opening 555C from the hole 575 in the first direction. The hole 576 is positioned away from the second passage opening 555C in the first direction, and is positioned away from the hole 575 in the first direction. The hole 576 is positioned between the hole 575 and the hole 572 in the first direction.

<2.5 Engagement Member 58A>

The engagement member 58A is supported by the first frame 55A, as illustrated in FIG. 8. The engagement member 58A is rotatable about the protrusion 556A. The engagement member 58A is connected to the one end portion in the first direction of the developing shutter 57. Specifically, the engagement member 58A is fixed to the one end portion in the first direction of the developing shutter 57. Accordingly, the developing shutter 57 is pivotally movable about the protrusion 556A along with rotation of the engagement member 58A between the developing closing position (see FIG. 8) and the developing opening position (see FIG. 9). The engagement member 58A has a disc-like shape. The engagement member 58A has a through-hole 580A, and two engagement grooves 581A and 582A.

The through-hole 580A is positioned at a diametrical center of the engagement member 58A. The through-hole 580A has a circular shape. The protrusion 556A of the first frame 55A is fitted in the through-hole 580A.

The engagement groove 581A is positioned away from the developing shutter 57 in a radial direction of the engagement member 58A. The engagement groove 581A is positioned on the opposite side of the through-hole 580A from the developing shutter 57 in the radial direction of the engagement member 58A. The engagement groove 581A extends in the radial direction of the engagement member 58A.

In a state where the developing shutter 57 is at the developing closing position, the engagement groove 581A communicates with the groove 557A of the protrusion 556A. Specifically, in a state where the developing shutter 57 is at the developing closing position illustrated in FIG. 8, the engagement groove 581A extends in a direction the same as a direction in which the groove 557A of the protrusion 556A extends. On the other hand, in a state where the developing shutter 57 is at the developing opening position illustrated in FIG. 9, the engagement groove 581A is positioned away from the groove 557A. That is, in a state where the developing shutter 57 is at the developing opening position, the engagement groove 581A extends in a direction different from the direction in which the groove 557A extends.

As illustrated in FIG. 8, the engagement groove 582A is positioned between the engagement groove 581A and the developing shutter 57 in the radial direction of the engagement member 58A. The engagement groove 582A is positioned between the through-hole 580A and the developing shutter 57 in the radial direction of the engagement member 58A. The engagement groove 582A is positioned on the opposite side of the through-hole 580A from the engagement groove 581A in the radial direction of the engagement member 58A. The engagement groove 582A is positioned away from the engagement groove 581A in the radial direction of the engagement member 58A. The engagement groove 582A extends in the radial direction of the engagement member 58A.

In a state where the developing shutter 57 is at the developing closing position, the engagement groove 582A communicates with the groove 557A of the protrusion 556A. Specifically, in a state where the developing shutter 57 is at the developing closing position, the engagement groove 582A extends in a direction in which the groove 557A of the protrusion 556A extends. On the other hand, in a state where the developing shutter 57 is at the developing opening position, the engagement groove 582A is positioned away from the groove 557A. That is, in a state where the developing shutter 57 is at the developing opening position, the engagement groove 582A extends in a direction different from the direction in which the groove 557A extends.

<2.6 Engagement Member 58B>

As illustrated in FIG. 4, the engagement member 58B is supported by the second frame 55B. The engagement member 58B is rotatable about the protrusion 556B. The engagement member 58B is connected to the other end portion in the first direction of the developing shutter 57. Specifically, the engagement member 58B is fixed to the other end portion in the first direction of the developing shutter 57. Hence, the developing shutter 57 is pivotally movable about the protrusion 556B along with rotation of the engagement member 58B between the developing closing position (see FIG. 8) and the developing opening position (see FIG. 9). The engagement member 58B has a disc-like shape. The engagement member 58B has a through-hole 580B, and two engagement grooves 581B and 582B.

The through-hole 580B is positioned at a diametrical center of the engagement member 58B. The through-hole 580B has a circular shape. The protrusion 556B of the second frame 55B is fitted in the through-hole 580B.

The engagement groove 581B is positioned away from the developing shutter 57 in a radial direction of the engagement member 58B. The engagement groove 581B is positioned on the opposite side of the through-hole 580B from the developing shutter 57 in the radial direction of the engagement member 58B. The engagement groove 581B extends in the radial direction of the engagement member 58B.

In a state where the developing shutter 57 is at the developing closing position, the engagement groove 581B communicates with the groove 557B of the protrusion 556B. Specifically, in a state where the developing shutter 57 is at the developing closing position, the engagement groove 581B extends in a direction the same as a direction in which the groove 557B of the protrusion 556B extends. On the other hand, in a state where the developing shutter 57 is at the developing opening position, the engagement groove 581B is positioned away from the groove 557B. That is, in a state where the developing shutter 57 is at the developing opening position, the engagement groove 581B extends in a direction different from the direction in which the groove 557B extends.

The engagement groove 582B is positioned between the engagement groove 581B and the developing shutter 57 in the radial direction of the engagement member 58B. The engagement groove 582B is positioned between the through-hole 580B and the developing shutter 57 in the radial direction of the engagement member 58B. The engagement groove 582B is positioned on the opposite side of the through-hole 580B from the engagement groove 581B in the radial direction of the engagement member 58B. The engagement groove 582B is positioned away from the engagement groove 581B in the radial direction of the engagement member 58B. The engagement groove 582B extends in the radial direction of the engagement member 58B.

In a state where the developing shutter 57 is at the developing closing position, the engagement groove 582B communicates with the groove 557B of the protrusion 556B. Specifically, in a state where the developing shutter 57 is at the developing closing position, the engagement groove 582B extends in a direction the same as the direction in which the groove 557B of the protrusion 556B extends. On the other hand, in a state where the developing shutter 57 is at the developing opening position, the engagement groove 582B is positioned away from the groove 557B. That is, in a state where the developing shutter 57 is at the developing opening position, the engagement groove 582B extends in a direction different from the direction in which the groove 557B extends.

<2.7 Developing Housing 53Y>

As illustrated in FIG. 8, the developing housing 53Y is positioned between the third frame 55C and the photosensitive drum 51Y in the connecting direction from the first axis A1 to the developing axis A2. The developing housing 53Y extends in the first direction. The developing housing 53Y is configured to accommodate therein toner that has passed through the first passage opening 553C.

Figure 5:
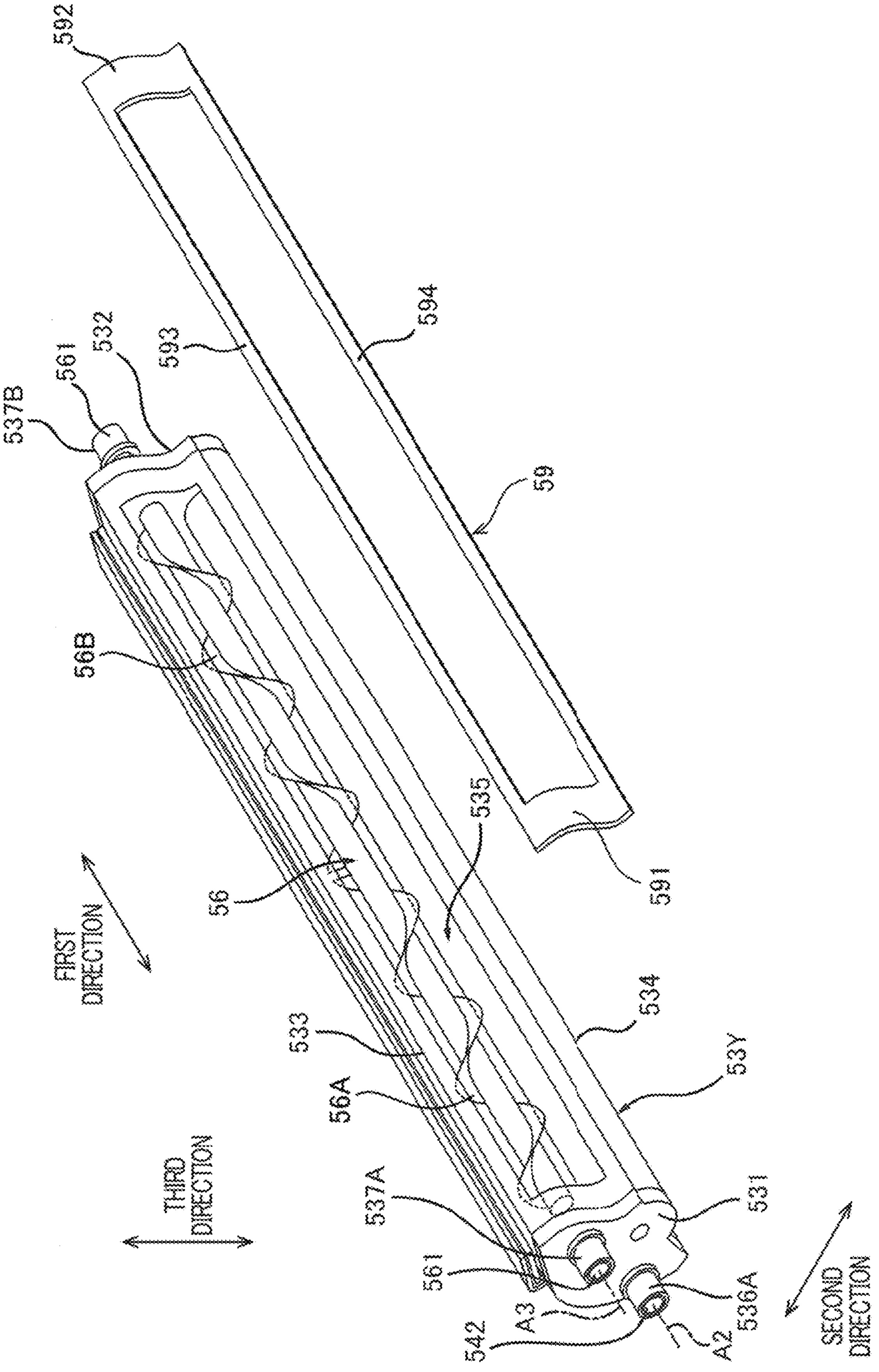
FIG. 5 is an exploded perspective view of a developing housing and a sealing member of the drum cartridge.

As illustrated in FIG. 5, the developing housing 53Y includes a first wall 531, a second wall 532, a third wall 533, and a fourth wall 534. The developing housing 53Y has an opening 535.

<2.7.1 First Wall 531>

The first wall 531 constitutes the one end portion in the first direction of the developing housing 53Y. The first wall 531 is positioned between the second wall 532 and the first frame 55A in the first direction. The first wall 531 faces the first frame 55A in the first direction. The first wall 531 extends in both the second direction and the third direction, and has one end portion and another end portion in the second direction. The first wall 531 supports one end portion in the first direction of the developing roller 54Y.

The developing roller 54Y includes a developing roller body 541, and a developing roller shaft 542, as illustrated in FIG. 6. The developing roller body 541 extends in the first direction. The developing roller body 541 has a solid cylindrical shape. The developing roller body 541 is positioned between the first wall 531 and the second wall 532 in the first direction. The developing roller body 541 is rotatable together with the developing roller shaft 542.

The developing roller shaft 542 extends in the first direction along the developing axis A2 to penetrate the developing roller body 541. One end portion in the first direction of the developing roller shaft 542 protrudes from one end portion in the first direction of the developing roller body 541. Another end portion in the first direction of the developing roller shaft 542 protrudes from another end portion in the first direction of the developing roller body 541. The first wall 531 supports the one end portion in the first direction of the developing roller shaft 542.

<2.7.2 Second Wall 532>

The second wall 532 constitutes the other end portion in the first direction of the developing housing 53Y. The second wall 532 is positioned away from the first wall 531 in the first direction. As illustrated in FIG. 6, the second wall 532 is positioned between the first wall 531 and the second frame 55B in the first direction. The second wall 532 faces the second frame 55B in the first direction. The second wall 532 extends in both the second direction and in the third direction, and has one end portion and another end portion in the second direction. The second wall 532 supports another end portion in the first direction of the developing roller 54Y. Specifically, the second wall 532 supports the other end portion in the first direction of the developing roller shaft 542.

As described above, the first wall 531 supports the one end portion in the first direction of the developing roller 54Y and the second wall 532 supports the other end portion in the first direction of the developing roller 54Y, whereby the developing roller 54Y is supported by the developing housing 53Y.

<2.7.3 Third Wall 533>

As illustrated in FIG. 5, the third wall 533 constitutes one end portion in the third direction of the developing housing 53Y. The third wall 533 is positioned between the first wall 531 and the second wall 532 in the first direction. The third wall 533 extends in both the first direction and in the second direction, and has one end portion and another end portion in the second direction. One end portion in the first direction of the third wall 553 is connected to the first wall 531. Another end portion in the first direction of the third wall 553 is connected to the second wall 532.

<2.7.4 Fourth Wall 534>

The fourth wall 534 constitutes another end portion in the third direction of the developing housing 53Y. The fourth wall 534 is positioned away from the third wall 533 in the third direction. The fourth wall 534 is positioned between the first wall 531 and the second wall 532 in the first direction. The fourth wall 534 extends in both the first direction and in the second direction, and has one end portion and another end portion in the second direction. One end portion in the first direction of the fourth wall 534 is connected to the first wall 531. Another end portion in the first direction of the fourth wall 534 is connected to the second wall 532.

<2.7.5 Opening 535>

The developing housing 53Y has one end portion and another end portion in the second direction. As illustrated in FIG. 8, the opening 535 is formed at the other end portion in the second direction of the developing housing 53Y. As illustrated in FIG. 5, the opening 535 extends from the first wall 531 to the second wall 532 in the first direction, and also extends from the third wall 533 to the fourth wall 534 in the third direction. Specifically, the opening 535 is an opening defined by the other end portions in the second direction of the first wall 531, the second wall 532, the third wall 533, and the fourth wall 534.

The first passage opening 553C and the second passage openings 554C and 555C are positioned within the opening 535 in the first direction and the third direction. Hence, the first passage opening 553C and the second passage openings 554C and 555C communicate with the internal space of the developing housing 53Y.

<2.8 First Conveying Member 56>

The first conveying member 56 is positioned inside the developing housing 53Y. The first conveying member 56 is configured to convey toner in the developing housing 53Y in the first direction. Specifically, the first conveying member 56 is configured to convey toner in the developing housing 53Y from the first passage opening 553C (see FIG. 6) toward the two second passage openings 554C and 555C (see FIG. 6). The first conveying member 56 extends in the first direction. In the present embodiment, the first conveying member 56 is an auger screw. The first conveying member 56 includes a shaft 561. The first conveying member 56 is rotatable about a third axis A3 extending in the first direction.

The first conveying member 56 also includes a first conveying part 56A, and a second conveying part 56B. The first conveying part 56A extends from a center portion in the first direction of the shaft 561 toward one end portion in the first direction of the shaft 561 to convey toner in the developing housing 53Y from the first passage opening 553C toward the second passage opening 554C. The second conveying part 56B extends from the center portion in the first direction of the shaft 561 toward another end portion in the first direction of the shaft 561 to convey toner in the developing housing 53Y from the first passage opening 553C toward the second passage opening 555C.

<2.9 Protrusions 537A, 536A, 537B, and 536B>

<2.9.1 Protrusion 537A>

As illustrated in FIG. 7, the protrusion 537A is positioned away from the photosensitive drum 51Y in the connecting direction from the first axis A1 to the developing axis A2. The protrusion 537A is fitted in the second through-hole 554A of the first frame 55A. As illustrated in FIG. 5, the protrusion 537A is positioned on the opposite side of the first wall 531 from the second wall 532 in the first direction. The protrusion 537A has a hollow cylindrical shape and extends in the first direction. In the present embodiment, the one end portion in the first direction of the shaft 561 is fitted in a through-hole in the protrusion 537A. Accordingly, the protrusion 537A supports the one end portion in the first direction of the shaft 561 so that the first conveying member 56 is rotatable. The protrusion 537A may extend in the first direction from one end surface in the first direction of the developing housing 53Y, or may be attached to the one end surface in the first direction of the developing housing 53Y.

<2.9.2 Protrusion 536A>

As illustrated in FIG. 7, the protrusion 536A is positioned between the photosensitive drum 51Y and the protrusion 537A in the connecting direction from the first axis A1 to the developing axis A2. The protrusion 536A is fitted in the third through-hole 553A of the first frame 55A. As illustrated in FIG. 5, the protrusion 536A is positioned on the opposite side of the first wall 531 from the second wall 532 in the first direction. The protrusion 536A has a hollow cylindrical shape and extends in the first direction. In the present embodiment, the one end portion in the first direction of the developing roller shaft 542 is fitted in a through-hole of the protrusion 536A. Therefore, the protrusion 536A supports the one end portion in the first direction of the developing roller shaft 542 so that the developing roller 54Y is rotatable. The protrusion 536A may extend in the first direction from the one end surface in the first direction of the developing housing 53Y, or may be attached to the one end surface in the first direction of the developing housing 53Y.

<2.9.3 Protrusion 537B>

The protrusion 537B is positioned away from the photosensitive drum 51Y in the connecting direction from the first axis A1 to the developing axis A2. The protrusion 537B is fitted in the second through-hole of the second frame 55B. The protrusion 537B is positioned on the opposite side of the second wall 532 from the first wall 531 in the first direction. The protrusion 537B has a hollow cylindrical shape and extends in the first direction. In the present embodiment, the other end portion in the first direction of the shaft 561 is fitted in a through-hole of the protrusion 537B. With this configuration, the protrusion 537B supports the other end portion in the first direction of the shaft 561 so that the first conveying member 56 is rotatable. The protrusion 537B may extend in the first direction from another end surface in the first direction of the developing housing 53Y, or may be attached to the other end surface in the first direction of the developing housing 53Y.

<2.9.4 Protrusion 536B>

The protrusion 536B is positioned between the photosensitive drum 51Y and the protrusion 537B in the connecting direction from the first axis A1 to the developing axis A2. The protrusion 536B is fitted in the third through-hole 553B of the second frame 55B. The protrusion 536B is positioned on the opposite side of the second wall 532 from the first wall 531 in the first direction. The protrusion 536B has a hollow cylindrical shape and extends in the first direction. In the present embodiment, the other end portion in the first direction of the developing roller shaft 542 is fitted in a through-hole of the protrusion 536B. Accordingly, the protrusion 536B supports the other end portion in the first direction of the developing roller shaft 542 so that the developing roller 54Y is rotatable. The protrusion 536B may extend in the first direction from the other end surface in the first direction of the developing housing 53Y, or may be attached to the other end surface in the first direction of the developing housing 53Y.

The developing housing 53Y is movable relative to the photosensitive drum 51Y in the direction from the first axis A1 to developing axis A2, since the protrusion 537A is fitted in the second through-hole 554A (see FIG. 7), the protrusion 536A is fitted in the third through-hole 553A (see FIG. 7), the protrusion 537B is fitted in the second through-hole of the second frame 55B, and the protrusion 536B is fitted in the third through-hole 553B.

<2.10 Sealing Member 59>

As illustrated in FIG. 8, the sealing member 59 seals a gap between the developing housing 53Y and the third frame 55C (see FIG. 6). The sealing member 59 is interposed between the developing housing 53Y and the third frame 55C in the second direction. As illustrated in FIG. 5, the sealing member 59 surrounds the opening 535 of the developing housing 53Y. The sealing member 59 is positioned around the first passage opening 553C and is positioned away from the first passage opening 553C. The sealing member 59 has a frame-like configuration. Specifically, the sealing member 59 includes a first seal part 591, a second seal part 592, a third seal part 593, and a fourth seal part 594.

The first seal part 591 constitutes one end portion in the first direction of the sealing member 59. The first seal part 591 extends in the third direction. The first seal part 591 is interposed between the other end portion in the second direction of the first wall 531 and the third frame 55C. The first seal part 591 seals a gap between the first wall 531 and the third frame 55C.

The second seal part 592 constitutes another end portion in the first direction of the sealing member 59. The second seal part 592 is positioned away from the first seal part 591 in the first direction. The second seal part 592 extends in the third direction. The second seal part 592 is interposed between the other end portion in the second direction of the second wall 532 and the third frame 55C. The second seal part 592 seals a gap between the second wall 532 and the third frame 55C.

The third seal part 593 constitutes one end portion in the third direction of the sealing member 59. The third seal part 593 extends in the first direction. One end portion in the first direction of the third seal part 593 is connected to the first seal part 591. Another end portion in the first direction of the third seal part 593 is connected to the second seal part 592. The third seal part 593 is interposed between the other end portion in the second direction of the third wall 533 and the third frame 55C. The third seal part 593 seals a gap between the third wall 533 and the third frame 55C.

The fourth seal part 594 constitutes another end portion in the third direction of the sealing member 59. The fourth seal part 594 is positioned away from the third seal part 593 in the third direction. The fourth seal part 594 extends in the first direction. One end portion in the first direction of the fourth seal part 594 is connected to the first seal part 591. Another end portion in the first direction of the fourth seal part 594 is connected to the second seal part 592. The fourth seal part 594 is interposed between the other end portion in the second direction of the fourth wall 534 and the third frame 55C. The fourth seal part 593 seals a gap between the fourth wall 534 and the third frame 55C.

The first passage opening 553C (see FIG. 4) and the two second passage openings 554C and 555C (see FIG. 4) are positioned between the first seal part 591 and the second seal part 592 in the first direction, and are positioned between the third seal part 593 and the fourth seal part 594 in the third direction. That is, the sealing member 59 is positioned around the first passage opening 553C and the second passage openings 554C and 555C, and is positioned away from the first passage opening 553C and the second passage openings 554C and 555C.

The sealing member 59 is elastically deformable in accordance with movement of the developing housing 53Y relative to the photosensitive drum 51Y. The elastic deformation of the sealing member 59 can restrain leakage of toner through the gap between the developing housing 53Y and third frame 55C when the developing housing 53Y is moved relative to the photosensitive drum 51Y. The sealing member 59 is made of, for example, sponge.

3. Details of Toner Cartridge 6Y

Next, the toner cartridge 6Y will be described in detail with reference to FIG. 1 and FIGS. 10 through 17. In the following description as to the toner cartridge 6Y, "the first direction", "the second direction" and "the third direction" are on a basis of a state where the toner cartridge 6Y is coupled to the drum cartridge 5Y and the drum cartridge 5Y is attached to the main housing 2.

Figure 10:
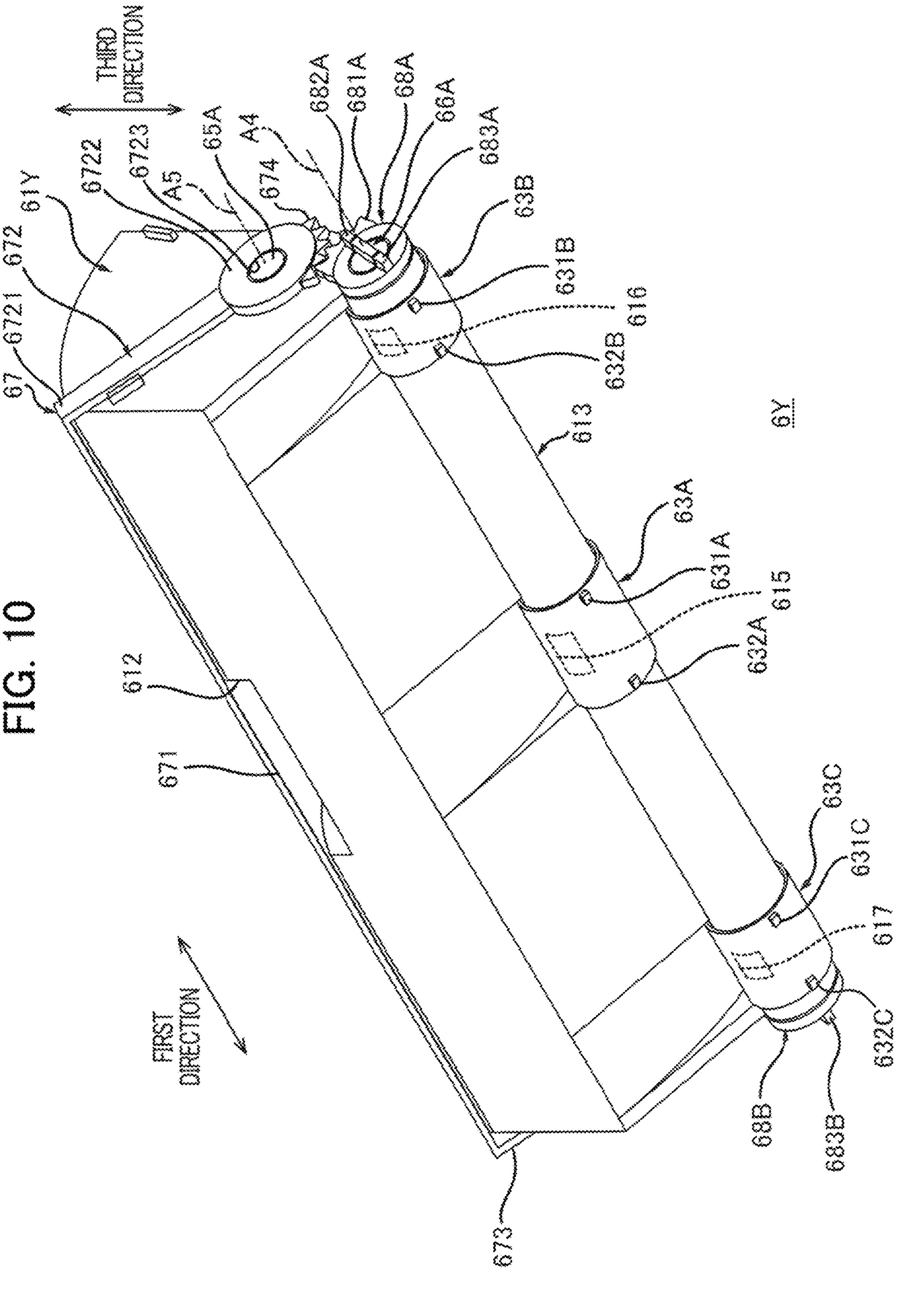
FIG. 10 is a perspective view of a toner cartridge.
Figure 11:
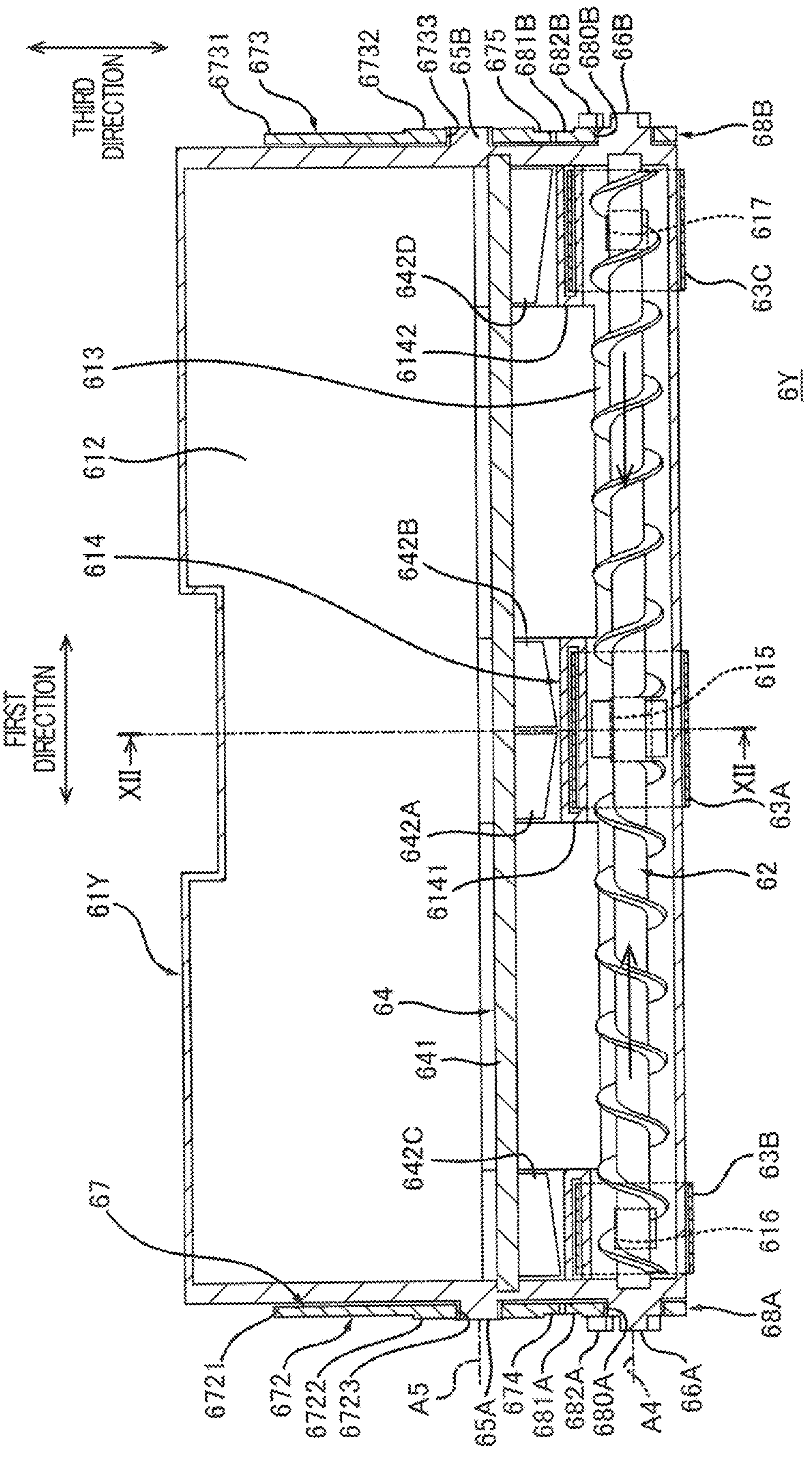
FIG. 11 is a cross-sectional view of the toner cartridge taken along line XI-XI in FIG. 12.

As illustrated in FIGS. 10 and 11, the toner cartridge 6Y includes a toner casing 61Y, three toner shutters 63A, 63B, and 63C, an agitator 64, two support parts 65A and 65B, two engagement parts 66A and 66B, a second conveying member 62, a lever 67, and two rotation members 68A and 68B.

<3.1 Toner Casing 61Y>

The toner casing 61Y is configured to accommodate toner therein. The toner casing 61Y includes a first accommodation part 612, a second accommodation part 613, and a partition wall 614.

<3.1.1 First Accommodation Part 612>

As illustrated in FIG. 10, the first accommodation part 612 extends in the first direction. The first accommodation part 612 constitutes one end portion in the third direction of the toner casing 61Y. The first accommodation part 612 has a box-like shape.

<3.1.2 Second Accommodation Part 613>

The second accommodation part 613 constitutes another end portion in the third direction of the toner casing 61Y. Specifically, the second accommodation part 613 is positioned downward of the first accommodation part 612. The second accommodation part 613 extends in the first direction. The second accommodation part 613 has a hollow cylindrical shape.

The second accommodation part 613 communicates with the first accommodation part 612. The second accommodation part 613 is configured to accommodate therein toner supplied from the first accommodation part 612. The second accommodation part 613 has a discharge opening 615, and two inlet openings 616 and 617. In other words, the toner cartridge 6Y has the discharge opening 615, and the two inlet openings 616 and 617.

<3.1.2.1 Discharge Opening 615>

The discharge opening 615 is positioned at a center portion in the first direction of the second accommodation part 613. The discharge opening 615 communicates with an internal space of the second accommodation part 613. Hence, toner in the second accommodation part 613 can be discharged through the discharge opening 615.

<3.1.2.2 Inlet Openings 616 and 617>

The inlet opening 616 is positioned at one end portion in the first direction of the second accommodation part 613. The inlet opening 616 is positioned away from the discharge opening 615 in the first direction. The inlet opening 616 communicates with the internal space of the second accommodation part 613. In a state where the toner cartridge 6Y is coupled to the drum cartridge 5Y (see FIG. 1), the inlet opening 616 is configured to allow returning toner to flow into the second accommodation part 613 therethrough.

The inlet opening 617 is positioned at another end portion in the first direction of the second accommodation part 613. The inlet opening 617 is positioned away from the discharge opening 615 in the first direction. The inlet opening 617 communicates with the internal space of the second accommodation part 613. As well as the inlet opening 616, in a state where the toner cartridge 6Y is coupled to the drum cartridge 5Y, the inlet opening 617 is configured to allow returning toner to flow into the second accommodation part 613 therethrough.

<3.1.3 Partition Wall 614>

Figure 12:
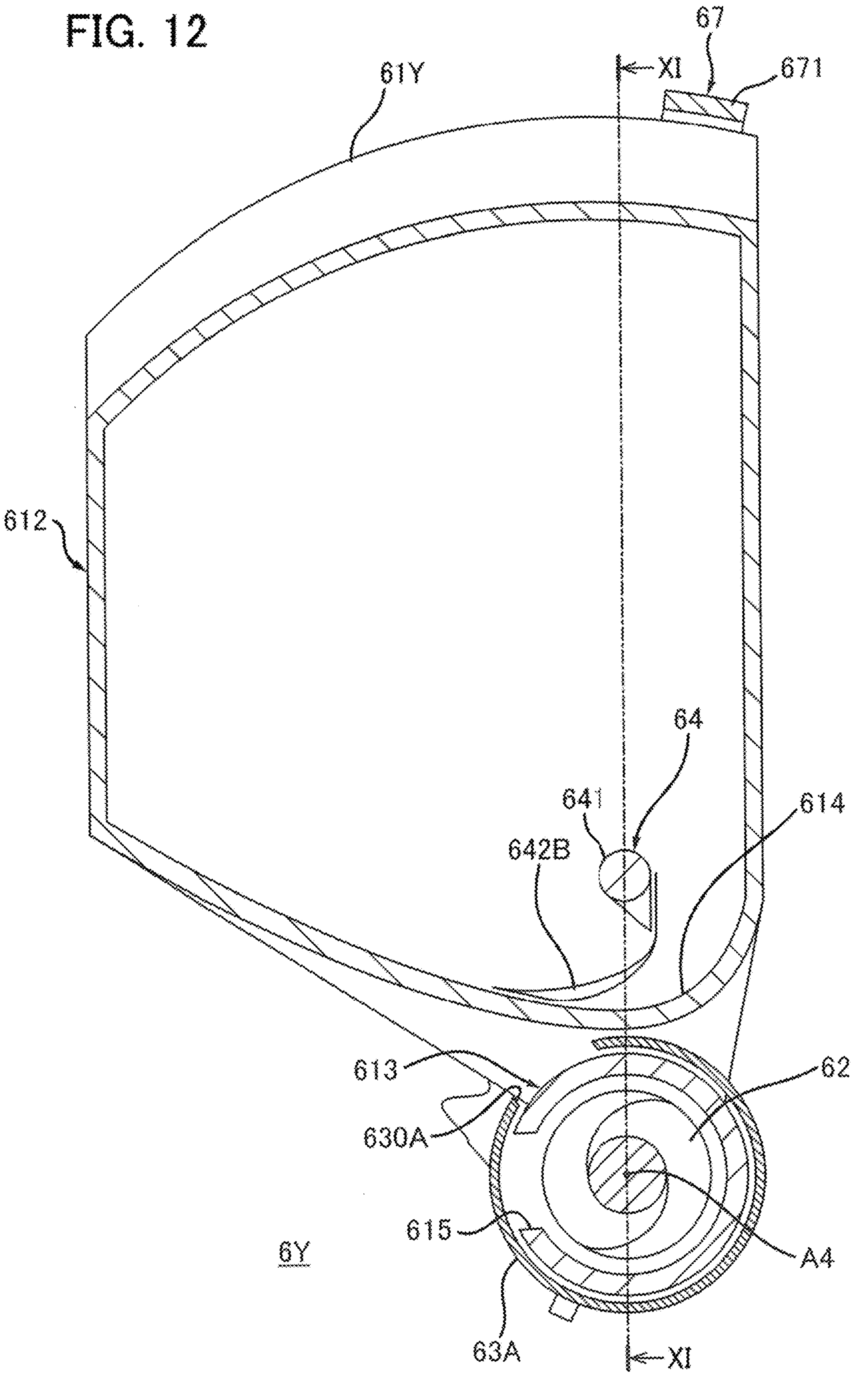
FIG. 12 is a cross-sectional view of the toner cartridge taken along line XII-XII in FIG. 11, and illustrating a state where a lever is at its first position.
Figure 13:
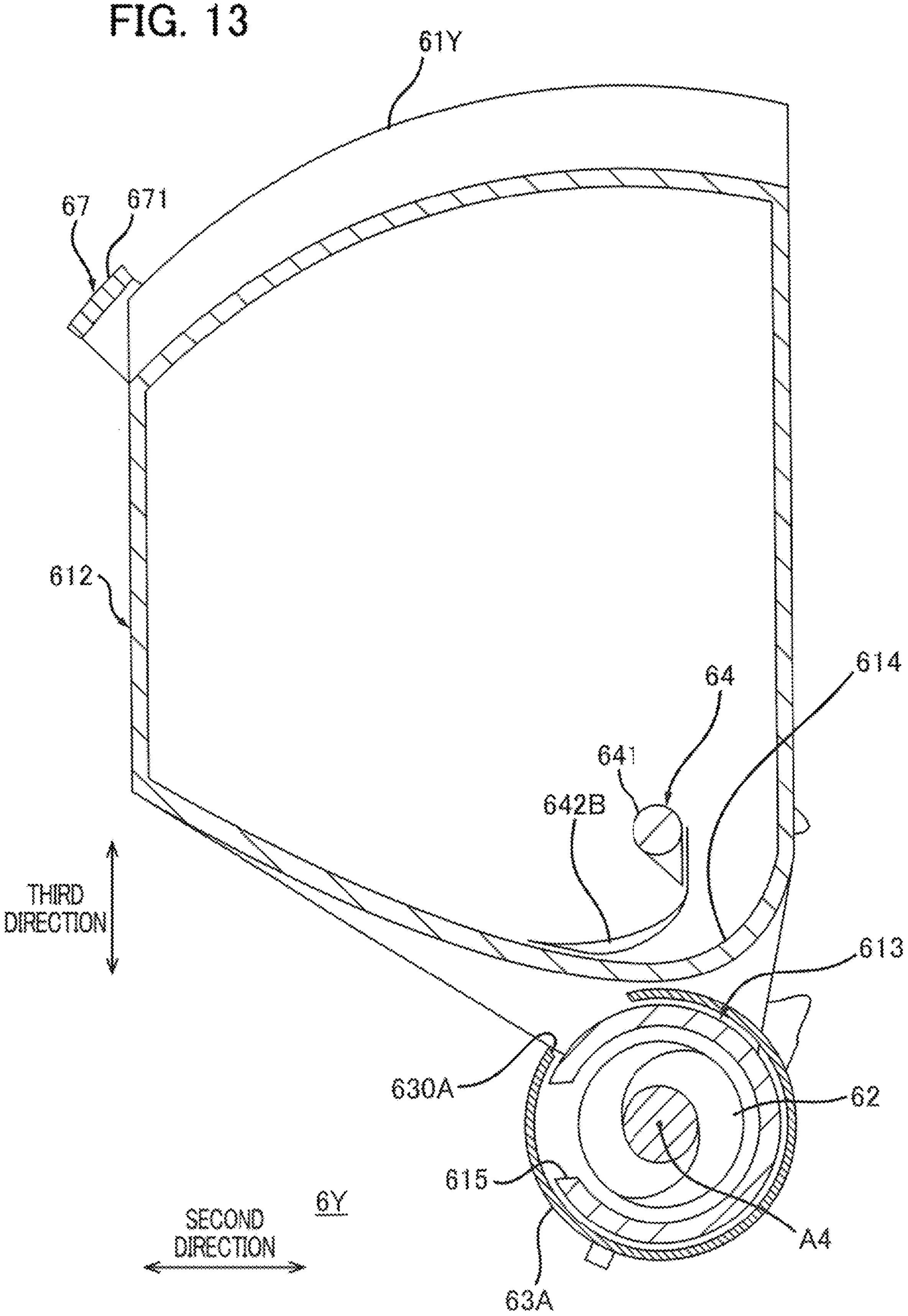
FIG. 13 is a cross-sectional view of the toner cartridge taken along line XII-XII in FIG. 11, and illustrating a state where the lever is at its second position.

As illustrated in FIGS. 11 and 12, the partition wall 614 is positioned between the first accommodation part 612 and the second accommodation part 613. The partition wall 614 partitions the first accommodation part 612 and the second accommodation part 613 from each other. The partition wall 614 extends in the first direction as illustrated in FIG. 11. The partition wall 614 has two openings 6141 and 6142.

The opening 6141 is positioned between the discharge opening 615 and the inlet opening 616 in the first direction. The internal space of the second accommodation part 613 communicates with an internal space of the first accommodation part 612 through the opening 6141. Toner in the first accommodation part 612 passes through the opening 6141 and enters the second accommodation part 613.

The opening 6142 is positioned between the discharge opening 615 and the inlet opening 617 in the first direction. The opening 6142 is positioned away from the opening 6141 in the first direction. The internal space of the second accommodation part 613 communicates with the internal space of the first accommodation part 612 through the opening 6142. Toner in the first accommodation part 612 passes through the opening 6142 and enters the second accommodation part 613.

<3.2 Toner Shutters 63A, 63B, and 63C>

As illustrated in FIG. 10, the toner shutter 63A is positioned at the center portion in the first direction of the second accommodation part 613. The toner shutter 63A is positioned on an outer peripheral surface of the second accommodation part 613. The toner shutter 63A extends in the first direction. The toner shutter 63A is configured to open and close the discharge opening 615. Specifically, the toner shutter 63A is movable between a toner closing position (a position illustrated in FIG. 12) and a toner opening position (a position illustrated in FIG. 14). In a state where the toner shutter 63A is at the toner closing position illustrated in FIG. 12, the toner shutter 63A closes the discharge opening 615. In a state where the toner shutter 63A is at the toner opening position illustrated in FIG. 14, the discharge opening 615 is open.

The toner shutter 63A includes two protrusions 631A and 632A as illustrated in FIG. 10. The toner shutter 63A has a shutter opening 630A as illustrated in FIG. 12.

In a state where the toner shutter 63A is at the toner closing position illustrated in FIG. 12, the shutter opening 630A is positioned away from the discharge opening 615. In a state where the toner shutter 63A is at the toner closing position, the shutter opening 630A do not communicate with the discharge opening 615. On the other hand, in a state where the toner shutter 63A is at the toner opening position illustrated in FIG. 14, the shutter opening 630A communicates with the discharge opening 615.

As illustrated in FIG. 10, the protrusion 631A is positioned at one end portion in the first direction of the toner shutter 63A. The protrusion 631A is positioned away from the discharge opening 615 in the first direction.

The protrusion 632A is positioned at another end portion in the first direction of the toner shutter 63A. The protrusion 632A is positioned away from the discharge opening 615 in the first direction. The protrusion 632A is positioned on the opposite side of the discharge opening 615 from the protrusion 631A in the first direction.

The toner shutter 63B is positioned at the one end portion in the first direction of the second accommodation part 613. The toner shutter 63B is positioned away from the toner shutter 63A in the first direction. The toner shutter 63B is positioned on the outer peripheral surface of the second accommodation part 613. The toner shutter 63B extends in the first direction. The toner shutter 63B is configured to open and close the inlet opening 616. Specifically, the toner shutter 63B is movable between a second toner closing position (a position illustrated in FIG. 10) and a second toner opening position. In a state where the toner shutter 63B is at the second toner closing position illustrated in FIG. 10, the toner shutter 63B closes the inlet opening 616. In a state where the toner shutter 63B is at the second toner opening position, the inlet opening 616 is open.

The toner shutter 63B includes two protrusions 631B and 632B as illustrated in FIG. 10. The toner shutter 63B has a shutter opening (not illustrated).

The shutter opening of the toner shutter 63B is positioned at a center portion in the first direction of the toner shutter 63B. In a state where the toner shutter 63B is at the second toner closing position, the shutter opening of the toner shutter 63B is positioned away from the inlet opening 616. That is, in a state where the toner shutter 63B is at the second toner closing position, the shutter opening of the toner shutter 63B does not communicate with the inlet opening 616. On the other hand, in a state where the toner shutter 63B is at the second toner opening position, the shutter opening of the toner shutter 63B communicates with the inlet opening 616.

The protrusion 631B is positioned at one end portion in the first direction of the toner shutter 63B. The protrusion 631B is positioned away from the inlet opening 616 in the first direction.

The protrusion 632B is positioned at another end portion in the first direction of the toner shutter 63B. The protrusion 632B is positioned away from the protrusion 631B in the first direction. The protrusion 632B is positioned on the opposite side of the inlet opening 616 from the protrusion 631B in the first direction.

The toner shutter 63C is positioned at the other end portion in the first direction of the second accommodation part 613. The toner shutter 63C is positioned away from the toner shutter 63A in the first direction. The toner shutter 63C is positioned on the opposite side of the toner shutter 63A from the toner shutter 63B in the first direction. The toner shutter 63C is positioned on the outer peripheral surface of the second accommodation part 613. The toner shutter 63C extends in the first direction. The toner shutter 63C is configured to open and close the inlet opening 617. Specifically, the toner shutter 63C is movable between a third toner closing position (a position illustrated in FIG. 10) and a third toner opening position. In a state where the toner shutter 63C is at the third toner closing position, the toner shutter 63C closes the inlet opening 617. In a state where the toner shutter 63C is at the third toner opening position, the inlet opening 617 is open.

The toner shutter 63C includes two protrusions 631C and 632C as illustrated in FIG. 10. The toner shutter 63C has a shutter opening (not illustrated).

The shutter opening of the toner shutter 63C is positioned at a center portion in the first direction of the toner shutter 63C. In a state where the toner shutter 63C is at the third toner closing position, the shutter opening of the toner shutter 63C is positioned away from the inlet opening 617. Therefore, in a state where the toner shutter 63C is at the third toner closing position, the shutter opening of the toner shutter 63C does not communicate with the inlet opening 617. In a state where the toner shutter 63C is at the third toner opening position, the shutter opening of the toner shutter 63C communicates with the inlet opening 617.

The protrusion 631C is positioned at one end portion in the first direction of the toner shutter 63C. The protrusion 631C is positioned away from the inlet opening 617 in the first direction.

The protrusion 632C is positioned at another end portion in the first direction of the toner shutter 63C. The protrusion 632C is positioned away from the protrusion 631C in the first direction. The protrusion 632C is positioned on the opposite side of the inlet opening 617 from the protrusion 631C in the first direction.

<3.3 Agitator 64>

As illustrated in FIG. 11, the agitator 64 is positioned within the first accommodation part 612. The agitator 64 is positioned at one side in the third direction of the partition wall 614. In a state where the toner cartridge 6Y is coupled to the drum cartridge 5Y and the drum cartridge 5Y is attached to the main housing 2, the agitator 64 is positioned upward of the partition wall 614. The agitator 64 includes an agitator shaft 641, and a plurality of fins 642A, 642B, 642C, and 642D.

The agitator shaft 641 extends in the first direction. The agitator shaft 641 has a solid cylindrical shape. One end portion in the first direction of the agitator shaft 641 is supported by one side wall in the first direction of the first accommodation part 612. Another end portion in the first direction of the agitator shaft 641 is supported by another side wall in the first direction of the first accommodation part 612.

The fins 642A and 642B are positioned at a center portion in the first direction within the first accommodation part 612. The fins 642A and 642B are mounted on a center portion in the first direction of the agitator shaft 641. The fins 642A and 642B are arranged in the first direction. The fins 642A and 642B face a center portion in the first direction of the partition wall 614. The fin 642A is configured to convey toner on the center portion in the first direction of the partition wall 614 in the first direction toward the opening 6141. The fin 642B is configured to convey toner on the center portion in the first direction of the partition wall 614 in the first direction toward the opening 6142.

The fin 642C is positioned at one end portion in the first direction within the first accommodation part 612. The fin 642C is mounted on the one end portion in the first direction of the agitator shaft 641. The fin 642C faces one end portion in the first direction of the partition wall 614. The fin 642C is configured to convey toner on the one end portion in the first direction of the partition wall 614 in the first direction toward the opening 6141.

The fin 642D is positioned at another end portion in the first direction within the first accommodation part 612. The fin 642D is mounted on the other end portion in the first direction of the agitator shaft 641. The fin 642D faces another end portion in the first direction of the partition wall 614. The fin 642D is configured to convey toner on the other end portion in the first direction of the partition wall 614 in the first direction toward the opening 6142.

<3.4 Support Parts 65A and 65B>

As illustrated in FIGS. 10 and 11, the support part 65A is positioned at one end portion in the first direction of the toner casing 61Y. Specifically, the support part 65A is positioned at one end surface in the first direction of the first accommodation part 612. More specifically, the support part 65A protrudes outward from the one end surface in the first direction of the first accommodation part 612. The support part 65A has a solid cylindrical shape.

As illustrated in FIG. 11, the support part 65B is positioned at another end portion in the first direction of the toner casing 61Y. Specifically, the support part 65B is positioned at another end surface in the first direction of the first accommodation part 612. More specifically, the support part 65B protrudes outward from the other end surface in the first direction of the first accommodation part 612. The support part 65B has a solid cylindrical shape.

<3.5 Engagement Part 66A>

As illustrated in FIGS. 10 and 11, the engagement part 66A is positioned at the one end portion in the first direction of the toner casing 61Y. Specifically, the engagement part 66A is positioned at one end surface in the first direction of the second accommodation part 613. The engagement part 66A is positioned at the other end portion in the third direction of the toner casing 61Y. The engagement part 66A is a rib. The engagement part 66A extends in a radial direction of the second accommodation part 613.

<3.6 Engagement Part 66B>

As illustrated in FIG. 11, the engagement part 66B is positioned at the other end portion in the first direction of the toner casing 61Y. Specifically, the engagement part 66B is positioned at another end surface in the first direction of the second accommodation part 613. The engagement part 66B is positioned at the other end portion in the third direction of the toner casing 61Y. The engagement part 66B is a rib. The engagement part 66B extends in the radial direction of the second accommodation part 613.

<3.7 Second Conveying Member 62>

The second conveying member 62 is configured to convey toner in the toner cartridge 6Y from the inlet opening 616 and the inlet opening 617 toward the discharge opening 615. The second conveying member 62 is accommodated in the second accommodation part 613.

The second conveying member 62 extends in the first direction. The second conveying member 62 is rotatable about a fourth axis A4. The second conveying member 62 is an auger screw. One end portion in the first direction of the second conveying member 62 is supported by the one end portion in the first direction of the second accommodation part 613. Another end portion in the first direction of the second conveying member 62 is supported by the other end portion in the first direction of the second accommodation part 613.

Figure 14:
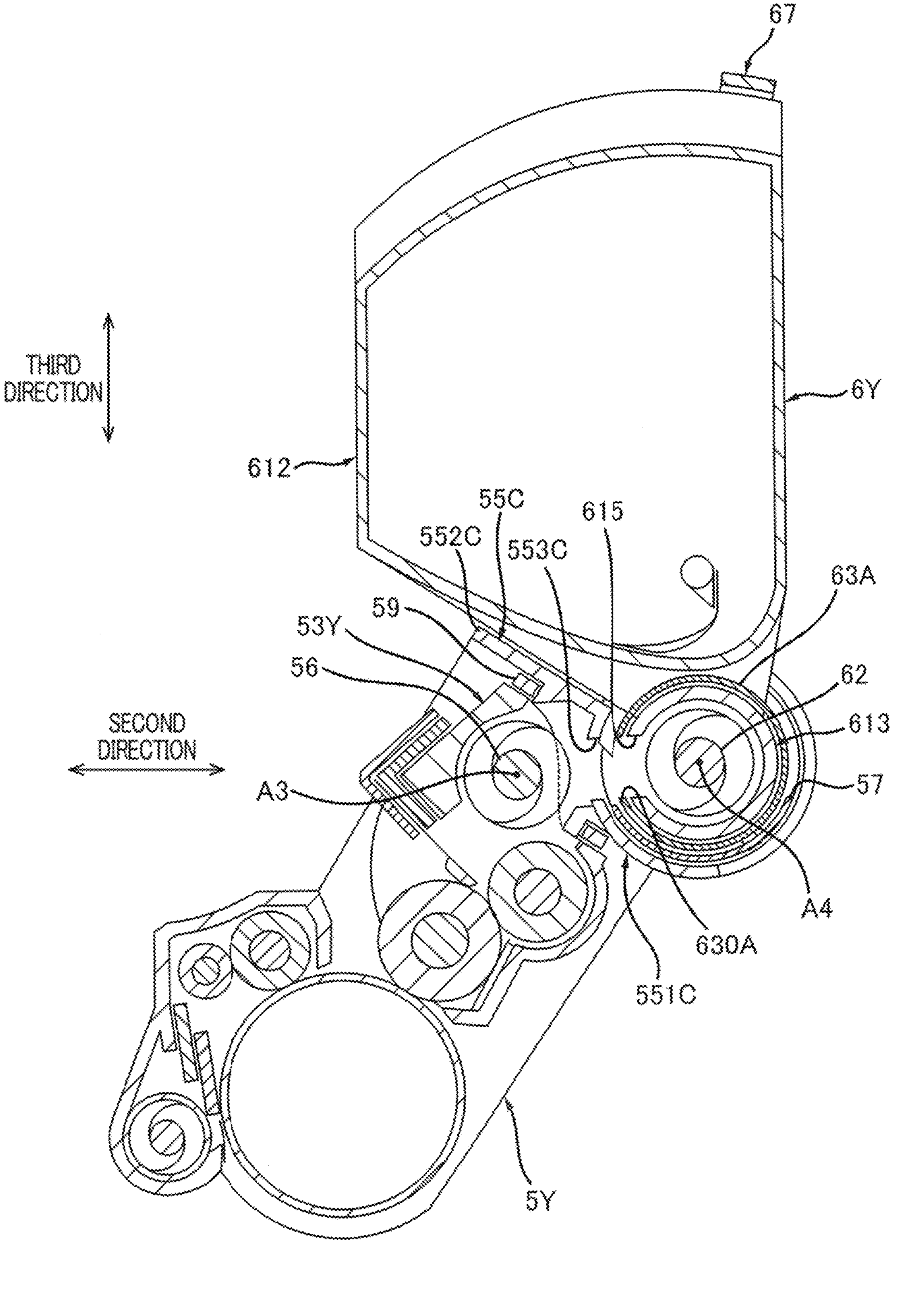
FIG. 14 is a cross-sectional view of the drum cartridge and the toner cartridge, and illustrating a state where the developing shutter is at the developing opening position and a toner shutter is at its toner opening position.

As illustrated in FIG. 12, the second conveying member 62 and the discharge opening 615 are arranged in the second direction. Further, the second conveying member 62 and the inlet openings 616 and 617 (see FIG. 11) are arranged in the second direction. Further, in a state where the toner cartridge 6Y is coupled to the drum cartridge 5Y, the second conveying member 62 and the first conveying member 56 are arranged in the second direction as illustrated in FIG. 14.

In a state where the toner cartridge 6Y is coupled to the drum cartridge 5Y, the second conveying member 62 is positioned on the opposite side of the discharge opening 615 from the first conveying member 56 in the second direction. Further, in a state where the toner cartridge 6Y is coupled to the drum cartridge 5Y, the fourth axis A4 and the third axis A3 are arranged in the second direction. In a state where the toner cartridge 6Y is coupled to the drum cartridge 5Y, the discharge opening 615 and the inlet openings 616 and 617 are positioned between the third axis A3 and the fourth axis A4 in the second direction.

<3.8 Lever 67>

As illustrated in FIG. 10, the lever 67 is mounted on the first accommodation part 612. The lever 67 is movable between a first position (a position illustrated in FIG. 15) and a second position (a position illustrated in FIG. 16). Specifically, the lever 67 is pivotally movable between the first position and the second direction about an axis A5.

As illustrated in FIG. 10, the lever 67 is positioned away from the toner shutters 63A, 63B, and 63C. The lever 67 is independent of the toner shutters 63A, 63B, and 63C. Hence, when the lever 67 is moved between the first position (see FIG. 12) and the second direction (see FIG. 13) in a state where the toner cartridge 6Y is detached from the drum cartridge 5Y, the toner shutters 63A, 63B, and 63C (see FIG. 10) are not moved.

As illustrated in FIG. 10, the lever 67 includes a grip 671, a first arm 672, and a second arm 673.

<3.8.1 Grip 671>

The grip 671 is positioned upward of the toner casing 61Y in the third direction. The grip 671 extends in the first direction.

<3.8.2 First Arm 672>

Figure 15:
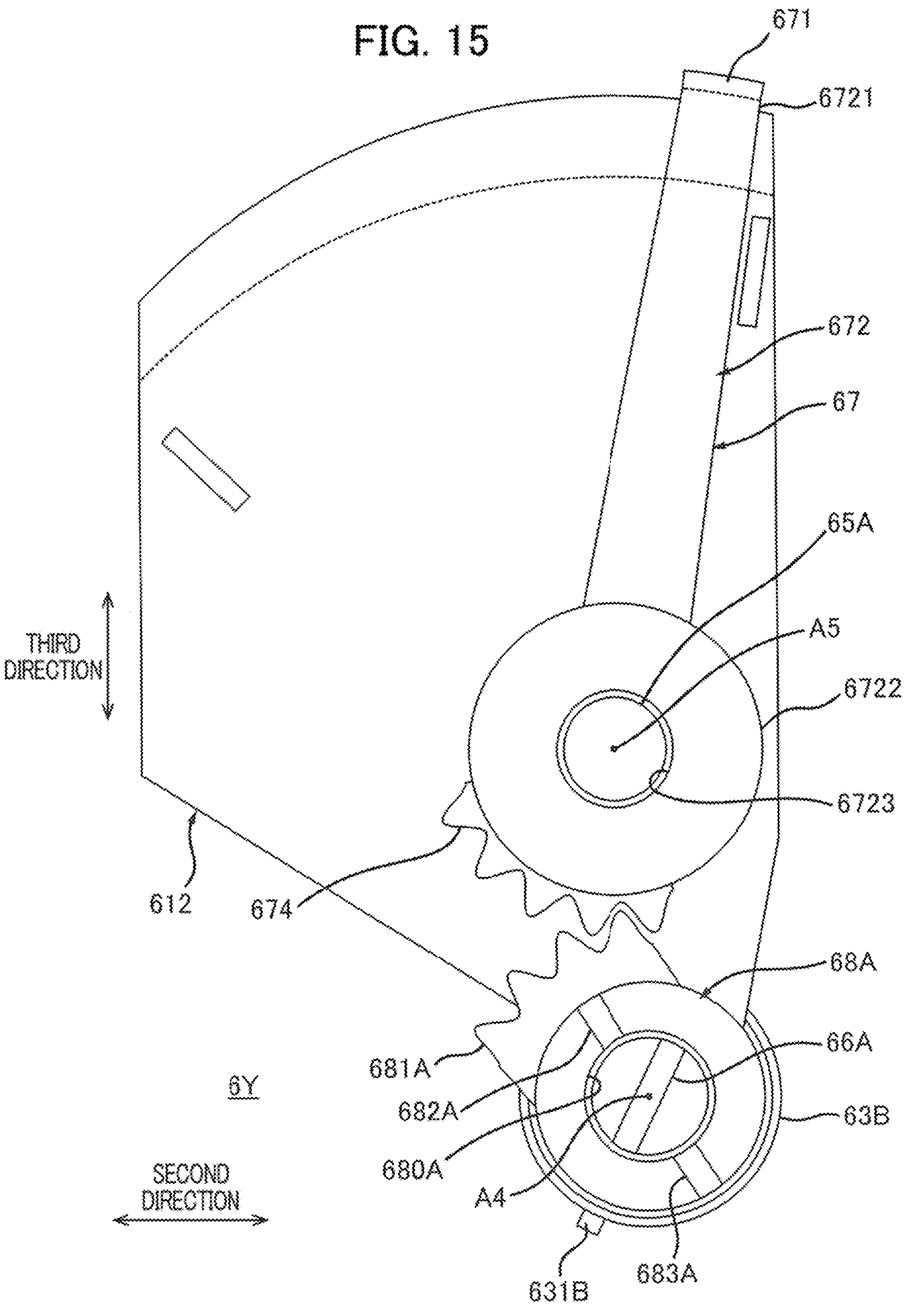
FIG. 15 is a view of the toner cartridge as viewed from the one side in the first direction, and illustrating a state where the lever is at the first position.

The first arm 672 is positioned at the one end portion in the first direction of the toner casing 61Y. As illustrated in FIG. 15, in a state where the lever 67 is at the first position, the first arm 672 extends in the third direction. The first arm 672 has a first end part 6721 and a second end part 6722, and includes a first gear 674. In other words, the lever 67 includes the first gear 674.

Figure 17:
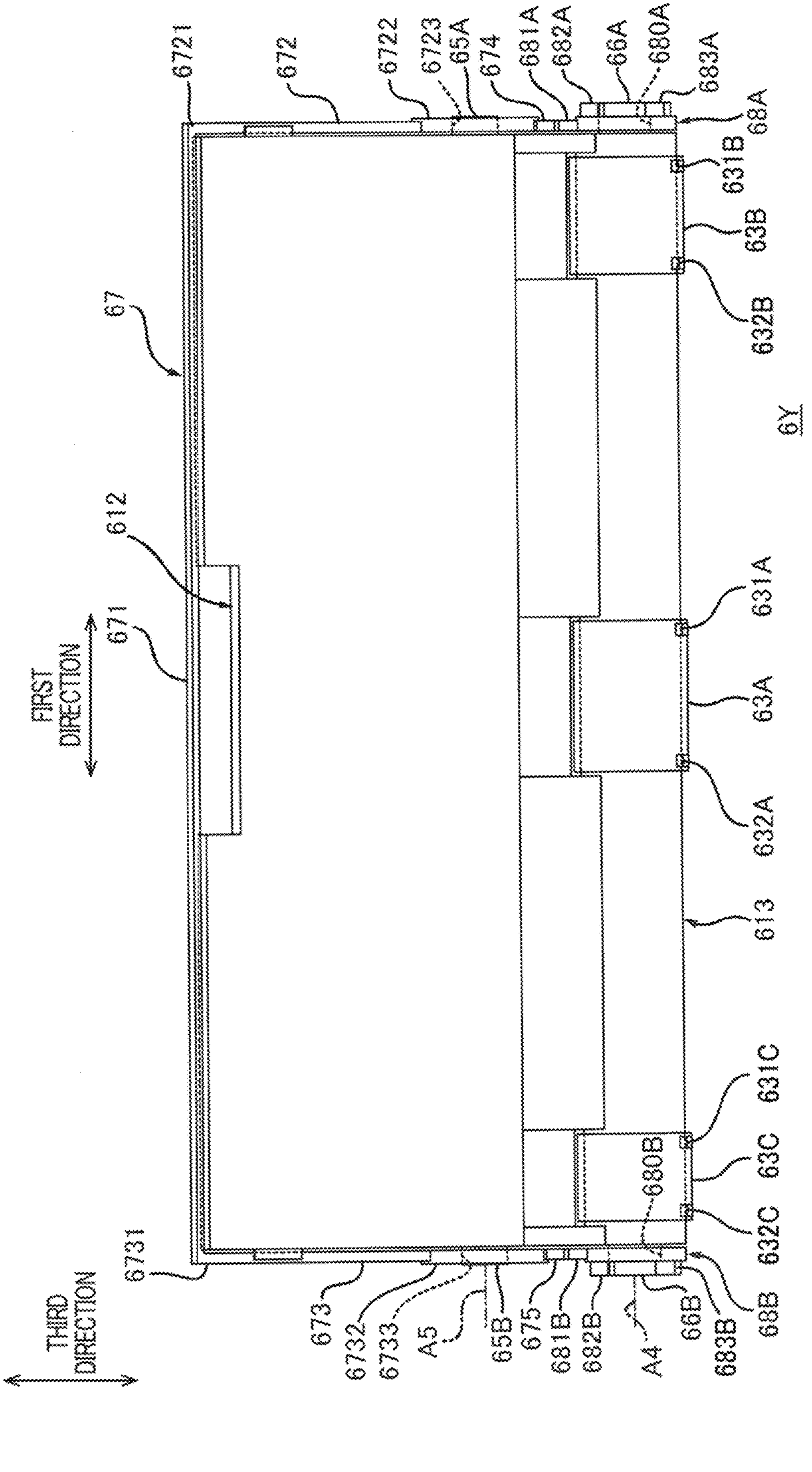
FIG. 17 is a view of the toner cartridge as viewed from another side in the second direction.

As illustrated in FIG. 17, the first end part 6721 is connected to one end portion in the first direction of the grip 671. In other words, the first arm 672 is connected to the one end portion in the first direction of the grip 671.

As illustrated in FIG. 15, the second end part 6722 is positioned away from the first end part 6721. The second end part 6722 is positioned between the grip 671 and the rotation member 68A. The second end part 6722 has a disc-like shape. The second end part 6722 has a through-hole 6723 positioned at a diametrical center of the second end part 6722. The through-hole 6723 has a circular shape. The support part 65A is fitted in the through-hole 6723. Hence, the first arm 672 is supported by the support part 65A.

The first gear 674 is positioned on a peripheral surface of the second end part 6722. The first gear 674 is positioned on the opposite side of the second end part 6722 from the first end part 6721. The first gear 674 includes a plurality of gear teeth arranged in a circumferential direction of the second end part 6722.

<3.8.3 Second Arm 673>

As illustrated in FIG. 17, the second arm 673 is positioned at the other end portion in the first direction of the toner casing 61Y. In a state where the lever 67 is at the first position (see FIG. 15), the second arm 673 extends in the third direction. The second arm 673 has a first end part 6731 and a second end part 6732, and includes a first gear 675. In other words, the lever 67 includes the first gear 675.

The first end part 6731 is connected to another end portion in the first direction of the grip 671. In other words, the second arm 673 is connected to the other end portion in the first direction of the grip 671.

The second end part 6732 is positioned away from the first end part 6731. The second end part 6732 is positioned between the grip 671 and the rotation member 68B. The second end part 6732 has a disc-like shape. The second end part 6732 has a through-hole 6733 positioned at a diametrical center of the second end part 6732. The through-hole 6733 has a circular shape. The support part 65B of the first accommodation part 612 is fitted in the through-hole 6733. Hence, the second arm 673 is supported by the support part 65B.

The first gear 675 is positioned on a peripheral surface of the second end part 6732. The first gear 675 is positioned on the opposite side of the second end part 6732 from the first end part 6731. The first gear 675 includes a plurality of gear teeth arranged in a circumferential direction of the second end part 6732.

<3.9 Rotation Member 68A>

As illustrated in FIG. 10, the rotation member 68A is positioned at the other end portion in the third direction of the toner casing 61Y. The rotation member 68A is positioned at the one end surface in the first direction of the second accommodation part 613. As illustrated in FIG. 15, the rotation member 68A is positioned around the engagement part 66A. The rotation member 68A is rotatable about the engagement part 66A. The rotation member 68A has a disc-like shape. The rotation member 68A is independent of each of the toner shutters 63A, 63B, and 63C. The rotation member 68A has a through-hole 680A, and includes a second gear 681A and two engagement parts 683A and 682A.

<3.9.1 Through-Hole 680A>

The through-hole 680A is positioned at a diametrical center of the rotation member 68A. The through-hole 680A has a circular shape. The engagement part 66A is fitted in the through-hole 680A.

<3.9.2 Second Gear 681A>

The second gear 681A is positioned on a peripheral surface of the rotation member 68A. The second gear 681A has a plurality of gear teeth arranged in a circumferential direction of the rotation member 68A. The second gear 681A is in meshing engagement with the first gear 674. Hence, the rotation member 68A is rotatable about the engagement part 66A in accordance with movement of the lever 67.

<3.9.3 Engagement Part 683A>

The engagement part 683A is positioned away from the second gear 681A in a radial direction of the rotation member 68A. The engagement part 683A extends in the radial direction of the rotation member 68A.

Figure 16:
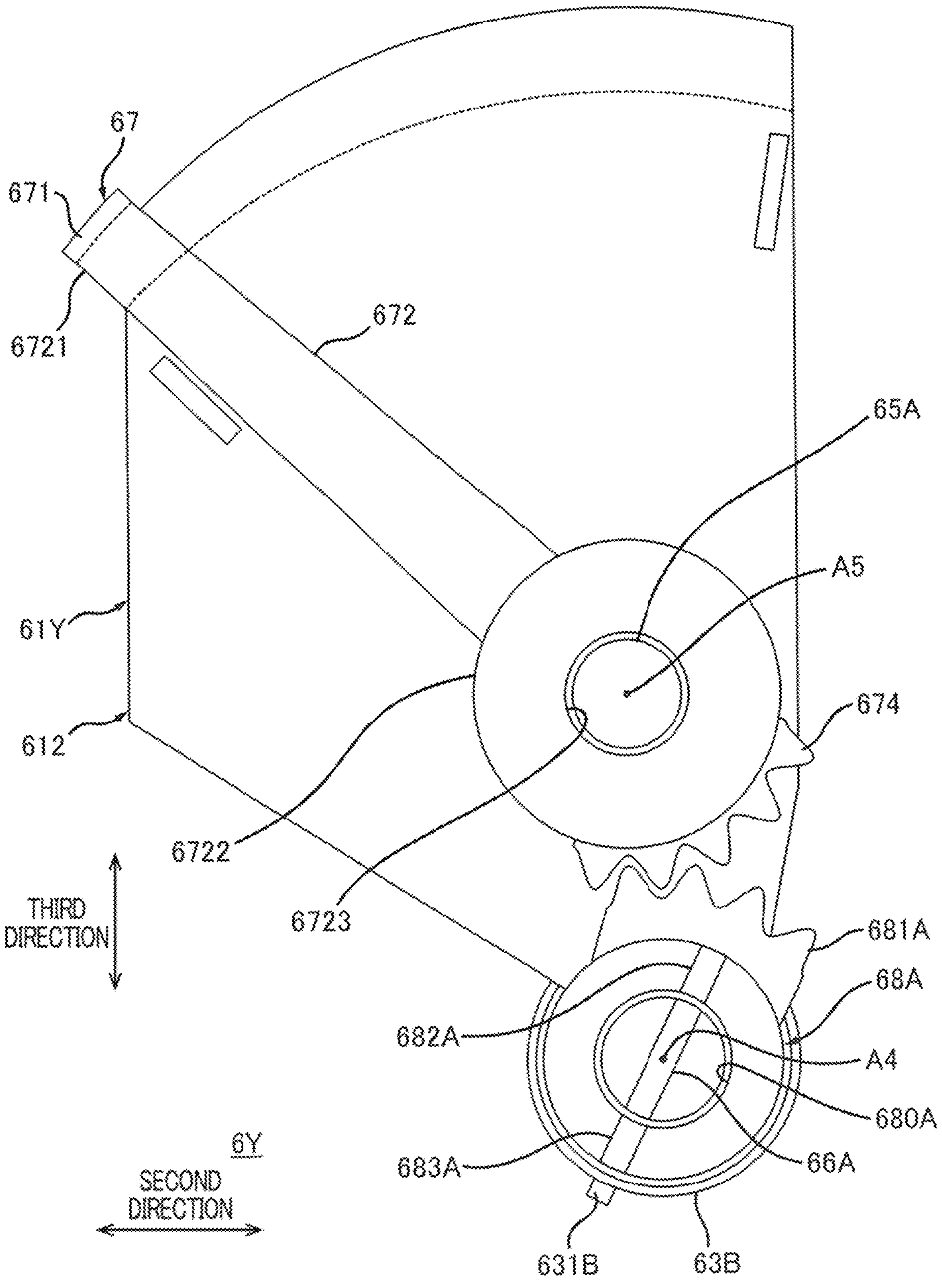
FIG. 16 is a view of the toner cartridge as viewed from the one side in the first direction, and illustrating a state where the lever is at the second position.

As illustrated in FIG. 15, in a state where the lever 67 is at the first position, the engagement part 683A is positioned away from the engagement part 66A. In a state where the lever 67 is at the first position, the engagement part 683A extends in a direction different from a direction in which the engagement part 66A extends. As illustrated in FIG. 16, in a state where the lever 67 is at the second position, the engagement part 683A is aligned with the engagement part 66A. That is, in a state where the lever 67 is at the second position, the engagement part 683A extends in a direction the same as the direction in which the engagement part 66A extends.

<3.9.4 Engagement Part 682A>

As illustrated in FIG. 15, the engagement part 682A is positioned between the second gear 681A and the engagement part 683A in the radial direction of the rotation member 68A. The engagement part 682A is positioned on the opposite side of the through-hole 680A from the engagement part 683A in the radial direction of the rotation member 68A. The engagement part 682A extends in the radial direction of the rotation member 68A. The engagement part 682A is positioned away from the engagement part 683A in the radial direction of the rotation member 68A.

In a state where the lever 67 is at the first position, the engagement part 682A is positioned away from the engagement part 66A. In a state where the lever 67 is at the first position, the engagement part 682A extends in a direction different from the direction in which the engagement part 66A extends. As illustrated in FIG. 16, in a state where the lever 67 is at the second position, the engagement part 682A is aligned with the engagement part 66A. In a state where the lever 67 is at the second position, the engagement part 682A extends in a direction the same as the direction in which the engagement part 66A extends.

<3.10 Rotation Member 68B>

As illustrated in FIG. 10, the rotation member 68B is positioned at the other end portion in the third direction of the toner casing 61Y. The rotation member 68B is positioned at the other end surface in the first direction of the second accommodation part 613. The rotation member 68B is positioned around the engagement part 66B (see FIG. 11). The rotation member 68B is rotatable about the engagement part 66B. The rotation member 68B has a disc-like shape. The rotation member 68B is independent of each of the toner shutters 63A, 63B, and 63C. The rotation member 68B has a configuration the same as that of the rotation member 68A (see FIG. 15). Specifically, as illustrated in FIG. 17, the rotation member 68B has a through-hole 680B, and includes a second gear 681B and two engagement parts 683B and 682B.

<3.10.1 Through-Hole 680B>

The through-hole 680B is positioned at a diametrical center of the rotation member 68B. The through-hole 680B has a circular shape. The engagement part 66B is fitted in the through-hole 680B.

<3.10.2 Second Gear 681B>

The second gear 681B is positioned on a peripheral surface of the rotation member 68B. The second gear 681B has a plurality of gear teeth arranged in a circumferential direction of the rotation member 68B. The second gear 681B is in meshing engagement with the first gear 675. Hence, the rotation member 68A is rotatable about the engagement part 66B in accordance with the movement of the lever 67.

<3.10.3 Engagement Part 683B>

The engagement part 683B is positioned away from the second gear 681B in a radial direction of the rotation member 68B. The engagement part 683B extends in the radial direction of the rotation member 68B.

In a state where the lever 67 is at the first position (see FIG. 15), the engagement part 683B is positioned away from the engagement part 66B. In a state where the lever 67 is at the first position, the engagement part 683B extends in a direction different from a direction in which the engagement part 66B extends. In a state where the lever 67 is at the second position (see FIG. 16), the engagement part 683B is aligned with the engagement part 66B. In a state where the lever 67 is at the second position, the engagement part 683B extends in a direction the same as the direction in which the engagement part 66B extends.

<3.10.4 Engagement Part 682B>

The engagement part 682B is positioned between the second gear 681B and the engagement part 683B in the radial direction of the rotation member 68B. The engagement part 682B is positioned on the opposite side of the through-hole 680B from the engagement part 683B in the radial direction of the rotation member 68B. The engagement part 682B extends in the radial direction of the rotation member 68B. The engagement part 682B is positioned away from the engagement part 683B in the radial direction of the rotation member 68B.

In a state where the lever 67 is at the first position (see FIG. 15), the engagement part 682B is positioned away from the engagement part 66B. In a state where the lever 67 is at the first position, the engagement part 682B extends in a direction different from the direction in which the engagement part 66B extends. In a state where the lever 67 is at the second position, the engagement part 682B is aligned with the engagement part 66B. In a state where the lever 67 is at the second position, the engagement part 682B extends in a direction the same as the direction in which the engagement part 66B extends.

4. Coupling of Toner Cartridge 6Y to Drum Cartridge 5Y

Next, a manner in which the toner cartridge 6Y is coupled to the drum cartridge 5Y will be described with reference to FIGS. 4, 6, 8, 10, 14, 17 and 18.

Figure 18:
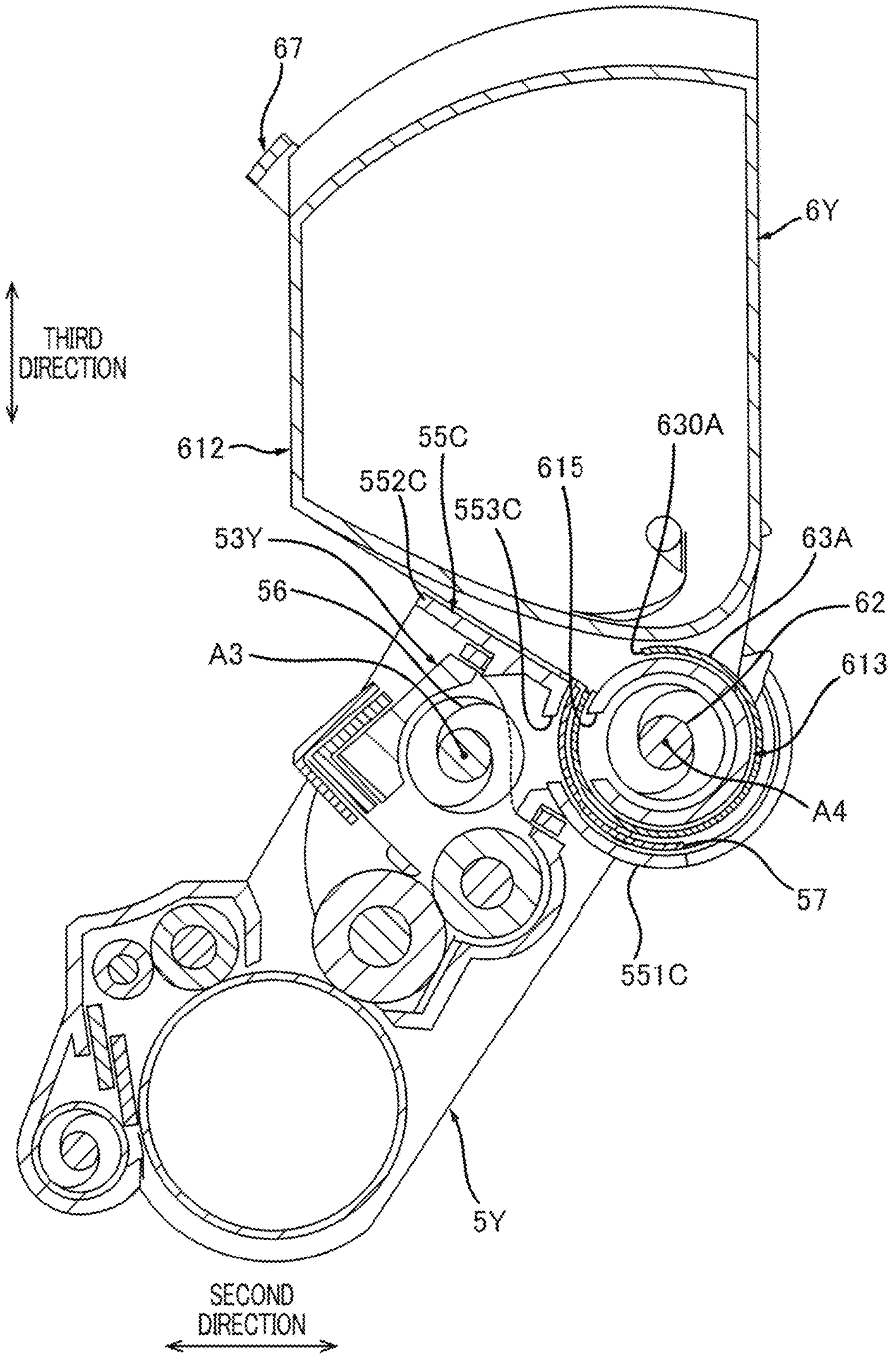
FIG. 18 is a cross-sectional view of the drum cartridge and the toner cartridge, and illustrating a state where the developing shutter is at the developing closing position and the toner shutter is at its toner closing position.

As illustrated in FIGS. 14 and 18, in a state where the toner cartridge 6Y is coupled to the drum cartridge 5Y, the lever 67 is pivotally movable between the first position (see FIG. 14) and the second position (see FIG. 18). In a state where the lever 67 is at the first position, the developing shutter 57 is at the developing opening position, as illustrated in FIG. 14. In a state where the lever 67 is at the second position, the developing shutter 57 is at the developing closing position, as illustrated in FIG. 18.

Specifically, as the second accommodation part 613 of the toner cartridge 6Y is fitted in the first part 551C of the drum cartridge 5Y, the toner cartridge 6Y is coupled to the drum cartridge 5Y in the third direction. In a state where the toner cartridge 6Y is coupled to the drum cartridge 5Y, the toner cartridge 6Y is positioned upward of the drum cartridge 5Y.

In a state where the toner cartridge 6Y is coupled to the drum cartridge 5Y, the engagement part 66A of the toner cartridge 6Y is fitted in the groove 557A (see FIG. 8) of the drum cartridge 5Y, and the engagement part 66B of the toner cartridge 6Y is fitted in the groove 557B (see FIG. 4) of the drum cartridge 5Y.

Further, in a state where the toner cartridge 6Y is coupled to the drum cartridge 5Y, the engagement part 683A (see FIG. 10) of the rotation member 68A is fitted in the engagement groove 582A (see FIG. 8) of the engagement member 58A, and the engagement part 682A (see FIG. 10) is fitted in the engagement groove 581A (see FIG. 8). Still further, in a state where the toner cartridge 6Y is coupled to the drum cartridge 5Y, the engagement part 683B (see FIG. 17) of the rotation member 68B is fitted in the engagement groove 582B (see FIG. 4) of the engagement member 58B, and the engagement part 682B (see FIG. 17) is fitted in the engagement groove 581B (see FIG. 4).

Accordingly, in a state where the toner cartridge 6Y is coupled to the drum cartridge 5Y, the engagement member 58A is engaged with the rotation member 68A and the engagement member 58B is engaged with the rotation member 68B, whereby the engagement member 58A is rotatable together with the rotation member 68A and the engagement member 58B is rotatable together with the rotation member 68B. That is, in a state where the toner cartridge 6Y is coupled to the drum cartridge 5Y, the developing shutter 57 is movable in accordance with the pivotal movement of the lever 67.

Further, in a state where the toner cartridge 6Y is coupled to the drum cartridge 5Y, the protrusion 631A (see FIG. 10) of the toner shutter 63A is fitted in the hole 571 (see FIG. 6) of the developing shutter 57, the protrusion 632A (see FIG. 10) is fitted in the hole 572 (see FIG. 6), the protrusion 631B (see FIG. 10) of the toner shutter 63B is fitted in the hole 573 (see FIG. 6), the protrusion 632B (see FIG. 10) is fitted in the hole 574, the protrusion 631C (see FIG. 10) of the toner shutter 63C is fitted in the hole 576 (see FIG. 6), and the protrusion 632C (see FIG. 10) is fitted in the hole 575 (see FIG. 6). Hence, in a state where the toner cartridge 6Y is coupled to the drum cartridge 5Y, the developing shutter 57 is movable together with the toner shutters 63A, 63B, and 63C.

When the lever 67 is pivotally moved from the first position to the second position in a state where the toner cartridge 6Y is coupled to the drum cartridge 5Y, the developing shutter 57 is moved from the developing opening position (see FIG. 14) to the developing closing position (see FIG. 18). In other words, in a state where the toner cartridge 6Y is coupled to the drum cartridge 5Y, the developing shutter 57 is moved from the developing opening position to the developing closing position in accordance with the movement of the lever 67 from the first position to the second position.

At this time, the toner shutter 63A is moved from the toner opening position (see FIG. 14) to the toner closing position (see FIG. 18) in accordance with the movement of the developing shutter 57 from the developing opening position (see FIG. 14) to the developing closing position (see FIG. 18). Further, the toner shutter 63B is moved from the second toner opening position to the second toner closing position in accordance with the movement of the developing shutter 57 from the developing opening position to the developing closing position. Still further, the toner shutter 63C is moved from the third toner opening position to the third toner closing position in accordance with the movement of the developing shutter 57 from the developing opening position to the developing closing position.

As illustrated in FIG. 18, in a state where the toner cartridge 6Y is coupled to the drum cartridge 5Y and the lever 67 is at the second position, the developing shutter 57 is at the developing closing position, the toner shutter 63A is at the toner closing position, the toner shutter 63B is at the second toner closing position, and the toner shutter 63C is at the third toner closing position. Hence, toner in the toner cartridge 6Y cannot be supplied to the developing housing 53Y.

On the other hand, when the lever 67 is moved from the second position to the first position in a state where the toner cartridge 6Y is coupled to the drum cartridge 5Y, the developing shutter 57 is moved from the developing closing position (see FIG. 18) to the developing opening position (see FIG. 14). In other words, in a state where the toner cartridge 6Y is coupled to the drum cartridge 5Y, the developing shutter 57 is moved from the developing closing position to the developing opening position in accordance with the movement of the lever 67 from the second position to the first position.

At this time, the toner shutter 63A is moved from the toner closing position to the toner opening position in accordance with the movement of the developing shutter 57 from the developing closing position to the developing opening position. Further, the toner shutter 63B is moved from the second toner closing position to the second toner opening position in accordance with the movement of the developing shutter 57 from the developing closing position to the developing opening position. Still further, the toner shutter 63C is moved from the third toner closing position to the third toner opening position in accordance with the movement of the developing shutter 57 from the developing closing position to the developing opening position.

As illustrated in FIG. 14, in a state where the toner cartridge 6Y is coupled to the drum cartridge 5Y and the lever 67 is at the first position, the developing shutter 57 is at the developing opening position, the toner shutter 63A is at the toner opening position, the toner shutter 63B is at the second toner opening position, and the toner shutter 63C is at the third toner opening position.

Hence, in a state where the toner cartridge 6Y is coupled to the drum cartridge 5Y and the lever 67 is at the first position, the discharge opening 615 of the toner cartridge 6Y communicates with the first passage opening 553C of the drum cartridge 5Y in the second direction, the inlet opening 616 communicates with the second passage opening 554C in the second direction, and the inlet opening 617 communicates with the second passage opening 555C in the second direction.

Thus, in a state where the toner cartridge 6Y is coupled to the drum cartridge 5Y and the lever 67 is at the first position, toner discharged through the discharge opening 615 (see FIG. 10) of the toner cartridge 6Y can pass through the first passage opening 553C, returning toner passed through the second passage opening 554C of the developing housing 53Y can flow into the toner cartridge 6Y through the inlet opening 616 (see FIG. 10), and returning toner passed through the second passage opening 555C of the developing housing 53Y can flow into the toner cartridge 6Y through the inlet opening 617 (see FIG. 10).

5. Operational and Technical Advantages (1) In the image forming apparatus 1 according to the above-described embodiment, the sealing member 59 is positioned around the first passage opening 553C and is positioned away from the first passage opening 553C, as illustrated in FIG. 14. This configuration can reduce probability of contact of toner supplied from the toner cartridge 6Y to the developing housing 53Y through the first passage opening 553C with the sealing member 59, thereby restraining the sealing member 59 from disturbing flow of toner to be supplied to the developing housing 53Y from the toner cartridge 6Y through the first passage opening 553C.

As a result, toner can be stably supplied from the toner cartridge 6Y to the developing housing 53Y and leakage of toner through the gap between the developing housing 53Y and the third frame 55C can be restrained in spite of such a configuration that the developing housing 53Y supporting the developing roller 54Y is movable relative to the photosensitive drum 51Y and the toner cartridge 6Y can be coupled to the drum cartridge 5Y but the toner cartridge 6Y is immovable relative to the photosensitive drum 51Y.

(2) According to the image forming apparatus 1, in a state where the toner cartridge 6Y is coupled to the drum cartridge 5Y, the discharge opening 615 is configured to communicate with the first passage opening 553C in the second direction, as illustrated in FIG. 14. With this configuration, toner can be smoothly supplied from the toner cartridge 6Y to the developing housing 53Y.

(3) According to the image forming apparatus 1, in a state where the toner cartridge 6Y is coupled to the drum cartridge 5Y as illustrated in FIG. 14, the second passage opening 554C (see FIG. 6) is configured to communicate with the inlet opening 616 (see FIG. 10) in the second direction, and the second passage opening 555C (see FIG. 6) is configured to communicate with the inlet opening 617 (see FIG. 10) in the second direction. Hence, toner in the developing housing 53Y can be smoothly returned to the toner cartridge 6Y through the second passage openings 554C and 555C. Accordingly, smooth circulation of toner can be attained between the developing housing 53Y and the toner cartridge 6Y, whereby toner can be restrained from being accumulated in the developing housing 53Y.

(4) According to the image forming apparatus 1, in a state where the toner cartridge 6Y is coupled to the drum cartridge 5Y, the first conveying member 56 and the second conveying member 62 are arranged in the second direction, as illustrated in FIG. 14. This configuration enables toner to be smoothly circulated between the developing housing 53Y and the toner cartridge 6Y.

(5) According to the image forming apparatus 1, the discharge opening 615 and the first passage opening 553C can be closed by one step operation of moving the lever 67 from the first position (see FIG. 14) to the second position (see FIG. 18). Further, the discharge opening 615 and the first passage opening 553C can be opened by one step operation of moving the lever 67 from the second position to the first position.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

Remarks

The drum cartridge 6Y is an example of the first drum cartridge. The photosensitive drum 51Y is an example of the first photosensitive drum. The drum cartridge 6M is an example of the second drum cartridge. The photosensitive drum 51M is an example of the second photosensitive drum. The toner cartridge 6Y is an example of the first toner cartridge. The toner cartridge 6M is an example of the second toner cartridge.

What is claimed is:

1. An image forming apparatus comprising:

a main housing;

a first drum cartridge comprising a first photosensitive drum rotatable about a first axis extending in a first direction, the first drum cartridge being attachable to and detachable from the main housing;

a second drum cartridge comprising a second photosensitive drum rotatable about a second axis extending in the first direction, the second drum cartridge being attachable to and detachable from the main housing, the first drum cartridge and the second drum cartridge being arranged in a second direction crossing the first direction in a state where both the first drum cartridge and the second drum cartridge are attached to the main housing;

a first toner cartridge configured to accommodate toner therein, the first toner cartridge being configured to be coupled to the first drum cartridge in a third direction crossing both the first direction and the second direction; and a second toner cartridge configured to accommodate toner therein, the second toner cartridge being configured to be coupled to the second drum cartridge in the third direction, wherein the first drum cartridge further comprises:

a first frame supporting one end portion in the first direction of the first photosensitive drum;

a second frame supporting another end portion in the first direction of the first photosensitive drum;

a third frame having a first passage opening configured to allow toner from the first toner cartridge to pass therethrough, the third frame being immovable relative to the first photosensitive drum;

a developing housing configured to accommodate therein toner that has passed through the first passage opening, the developing housing being movable relative to the first photosensitive drum; and a sealing member positioned around and away from the first passage opening, the sealing member sealing a gap between the developing housing and the third frame.

2. The image forming apparatus according to claim 1, wherein the third direction is parallel to an up-down direction, and wherein, in a state where the first toner cartridge is coupled to the first drum cartridge, the first toner cartridge is positioned upward of the first drum cartridge.

3. The image forming apparatus according to claim 2, wherein the first toner cartridge has a discharge opening configured to allow toner to be discharged therethrough, and wherein, in a state where the first toner cartridge is coupled to the first drum cartridge, the discharge opening is configured to communicate with the first passage opening in the second direction.

4. The image forming apparatus according to claim 3, wherein the first toner cartridge further has an inlet opening positioned away from the discharge opening in the first direction, the inlet opening being configured to allow toner from the developing housing to flow into the first toner cartridge therethrough in a state where the first toner cartridge is coupled to the first drum cartridge, and wherein the third frame further has a second passage opening positioned away from the first passage opening in the first direction, the second passage opening being configured to communicate with the inlet opening in the second direction to allow toner in the developing housing to pass therethrough in a state where the first toner cartridge is coupled to the first drum cartridge.

5. The image forming apparatus according to claim 4, wherein the first drum cartridge further comprises:

a first conveying member configured to convey toner in the developing housing from the first passage opening toward the second passage opening, and wherein the first toner cartridge comprises:

a second conveying member configured to convey toner in the first toner cartridge from the inlet opening toward the discharge opening.

6. The image forming apparatus according to claim 5, wherein, in a state where the first toner cartridge is coupled to the first drum cartridge, the first conveying member and the second conveying member are arranged in the second direction.

7. The image forming apparatus according to claim 1, wherein the main housing has an opening formed at one end portion in the second direction of the main housing, the image forming apparatus further comprising:

a drawer movable in the second direction through the opening between:

an internal position in which the drawer is positioned inside the main housing; and an external position in which at least a portion of the drawer is positioned outside the main housing, wherein both the first drum cartridge and the second drum cartridge are configured to be supported by the drawer.

8. The image forming apparatus according to claim 1, wherein the first toner cartridge comprises:

a toner casing configured to accommodate toner therein, the toner casing having a discharge opening configured to allow toner to be discharged therethrough;

a toner shutter movable between:

a toner closing position in which the toner shutter closes the discharge opening; and a toner opening position in which the discharge opening is open;

a lever comprising a first gear, the lever being movable between a first position and a second position; and a rotation member comprising a second gear in meshing engagement with the first gear, the rotation member being rotatable in accordance with movement of the lever, the rotation member being independent of the toner shutter, wherein the first drum cartridge further comprises:

a developing shutter supported by the third frame, the developing shutter being movable between:

a developing closing position in which the developing shutter closes the first passage opening; and a developing opening position in which the first passage opening is open; and an engagement member connected to the developing shutter, the engagement member being in engagement with the rotation member in a state where the first toner cartridge is coupled to the first drum cartridge, and wherein, in a state where the first toner cartridge is coupled to the first drum cartridge, the developing shutter is movable together with the toner shutter, and is movable from the developing opening position toward the developing closing position in accordance with movement of the lever from the first position toward the second position and is also movable from the developing closing position toward the developing opening position in accordance with movement of the lever from the second position toward the first position.

9. The image forming apparatus according to claim 8, wherein the lever further comprises:

a grip extending in the first direction;

a first arm connected to one end portion in the first direction of the grip; and a second arm connected to another end portion in the first direction of the grip, and wherein each of the first arm and the second arm comprises the first gear.

* * * * *